(12) United States Patent
Mishina et al.

(10) Patent No.: US 7,587,221 B2
(45) Date of Patent: Sep. 8, 2009

(54) SENSOR NETWORK MANAGEMENT SYSTEM

(75) Inventors: Yusuke Mishina, Kunitachi (JP); Toshio Okochi, Musashino (JP); Akiko Sato, Musashino (JP); Masahiro Motobayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 618 days.

(21) Appl. No.: 11/357,092

(22) Filed: Feb. 21, 2006

(65) Prior Publication Data

US 2006/0190458 A1 Aug. 24, 2006

(30) Foreign Application Priority Data

Feb. 22, 2005 (JP) .............................. 2005-044940

(51) Int. Cl.
*H04B 7/00* (2006.01)
*H04B 7/15* (2006.01)
*H04M 1/00* (2006.01)
*H04Q 7/20* (2006.01)

(52) U.S. Cl. .................... 455/524; 455/561; 455/435.1; 455/11.1

(58) Field of Classification Search ................ 455/411, 455/410, 435.1, 422.1, 445, 432.1, 524, 561, 455/11.1; 340/539.22, 539.13
See application file for complete search history.

(56) References Cited

U.S. PATENT DOCUMENTS

| | | | |
|---|---|---|---|
| 6,473,411 | B1 | 10/2002 | Kumaki et al. |
| 6,944,479 | B2 * | 9/2005 | Andaker et al. ............. 455/560 |
| 7,298,259 | B2 * | 11/2007 | Moriwaki .............. 340/539.22 |
| 7,298,733 | B2 * | 11/2007 | Sakai et al. .................. 370/352 |
| 2004/0243712 | A1 * | 12/2004 | Sakai et al. .................. 709/227 |
| 2006/0101026 | A1 * | 5/2006 | Fukushima ................. 707/100 |
| 2008/0292101 | A1 * | 11/2008 | Macchi ....................... 380/270 |

FOREIGN PATENT DOCUMENTS

JP 11-266278 4/1998

OTHER PUBLICATIONS

"A Primer to the Implementation of Smart Card Management and Related Systems", Version 1.0, GlobalPlatform Oct. 2000, pp. 2-47.

\* cited by examiner

*Primary Examiner*—Tilahun Gesesse
(74) *Attorney, Agent, or Firm*—Stites & Harbison PLLC; Juan Carlos A. Marquez, Esq.

(57) ABSTRACT

An attribute value of a matter accompanied by a sensor is transmissibly accessible in a sensor node system constituted by wireless terminal computers having the sensor, the wireless communication base stations and server computers. The wireless terminal computer reports at the time of wireless communication an identification number of a wireless communication base station with which it communicates previously. A relay processing service is dynamically constituted so that when a wireless communication base station different from itself is reported, the wireless base station as the communication counter-part can transmissbly look up the wireless terminal computer from a host computer.

6 Claims, 31 Drawing Sheets

FIG. 4

| SENSOR NODE GLOBAL ID /400 | SENSOR NODE LOCAL ID /401 | GATEWAY RELAY SERVICE ID /402 |
|---|---|---|
| FF FF FF C1 | 01 | 10000 |
| FF FF FF C2 | 02 | 10010 |

FIG. 7

| SENSOR NODE GLOBAL ID | GATEWAY GLOBAL ID | GATEWAY RELAY SERVICE ID |
|---|---|---|
| FF FF FF C1 | 133.144.22.22 | 10000 |
| FF FF FF C2 | 133.144.22.22 | 10010 |

FIG. 8

| ENTITY ID | SENSOR NODE GLOBAL ID |
|---|---|
| 2004IT10 | FF FF FF C1 |
| 2001CS30 | FF FF FF C2 |

FIG. 10

| ENTITY ID | BASIC ATTRIBUTE INFORMATION | SENSOR ATTRIBUTE INFORMATION |
|---|---|---|
| 2004IT10 | 20040801102542 | 36.5 |
| 2001CS30 | 20040801102548 | 37.2 |

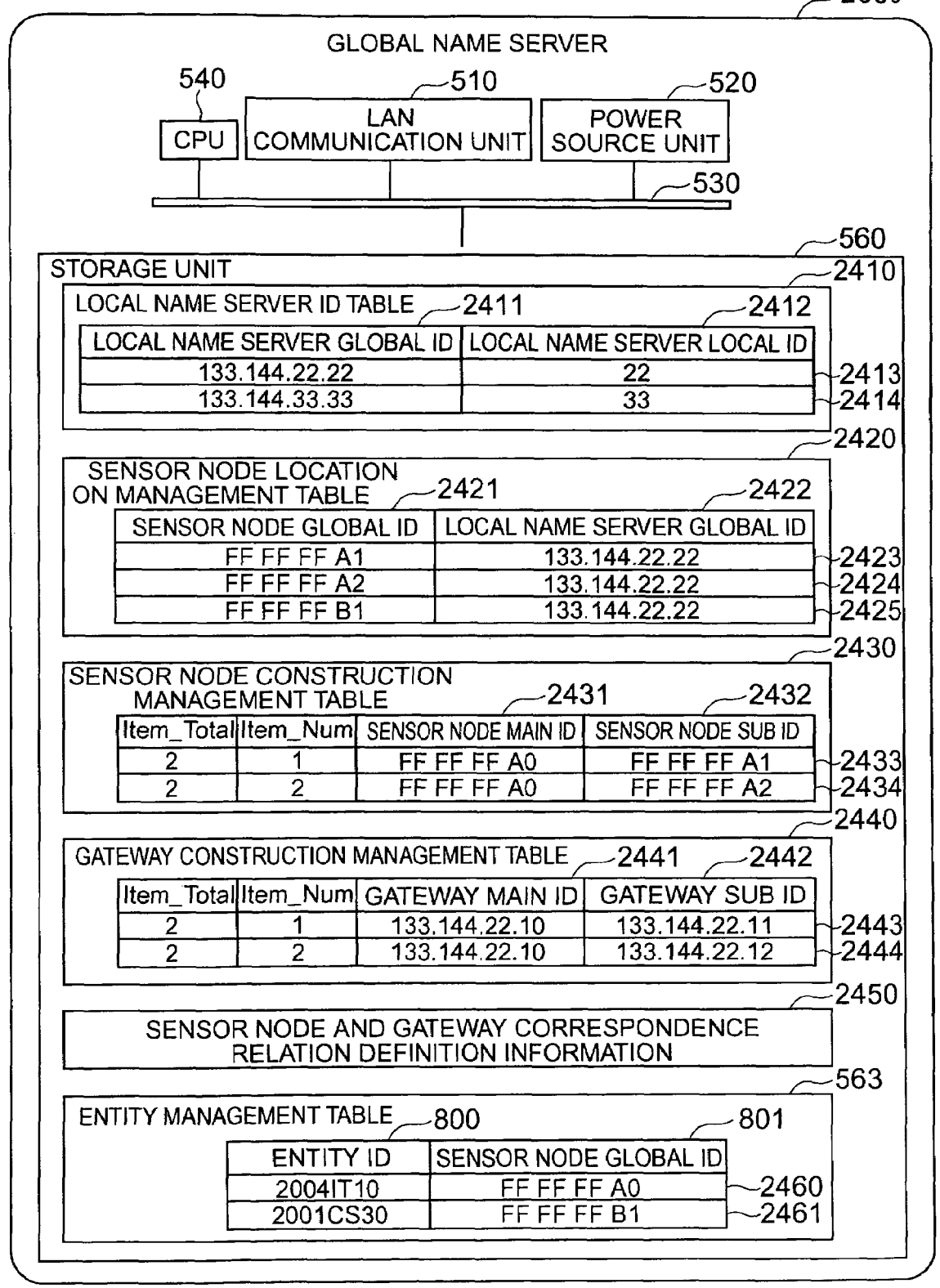

FIG. 25

2501 — (1) DATA IS ACQUIRED FOR ALL COMBINATIONS OF SENSOR NODE AND GATEWAY.

SN_Main="FF FF FF A0"
GW_Main="133.144.22.10"
SN_Main=(SN_Sub1,SN_Sub2)
GW_Main=(GW_Sub11,GW_Sub2)
(SN_Main GW_Main)=       (SN_Sub1,GW_Sub1)
                    AND (SN_Sub1,GW_Sub2)
                    AND (SN_Sub2,GW_Sub1)
                    AND (SN_Sub2,GW_Sub2)

2502 — (2) EXPANSION RESULT OF RUE OF (1) BY USING DATA OF SENSOR NODE CONSTRUCTION MANAGEMENT TABLE AND GATEWAY CONSTRUCTION MANAGEMENT TABLE (SN_Main,GW_Main)
    = (FF FF FF A0,133.144.22.10)
    =      (FF FF FF A1,133.144.22.11)
       AND (FF FF FF A1,133.144.22.12)
       AND (FF FF FF A2,133.144.22.11)
       AND (FF FF FF A2,133.144.22.12)

2503 — (3) DATA IS ACQUIRED FOR ANY ONE OF COMBINATIONS OF SENSOR NODE AND GATEWAY.

SN_Main="FF FF FF A0"
GW_Main="133.144.22.10"
SN_Main=(SN_Sub1,SN_Sub2)
GW_Main=(GW_Sub11,GW_Sub2)
(SN_Main GW_Main)=       (SN_Sub1,GW_Sub1)
                     OR (SN_Sub1,GW_Sub2)
                     OR (SN_Sub2,GW_Sub1)
                     OR (SN_Sub2,GW_Sub2)

2504 — (4) EXPANSION RESULT OF RULE OF (3) BY USING DATA OF SENSOR NODE CONSTRUCTION MANAGEMENT TABLE AND GATEWAY CONSTRUCTION MANAGEMENT TABLE (SN_Main,GW_Main)
    = (FF FF FF A0,133.144.22.10)
    =      (FF FF FF A1,133.144.22.11)
       OR (FF FF FF A1,133.144.22.12)
       OR (FF FF FF A2,133.144.22.11)
       OR (FF FF FF A2,133.144.22.12)

FIG. 26

(5) DATA IS ACQUIRED FOR EXCLUSIVE COMBINATION OF SENSOR NODE AND GATEWAY. ~2505

SN_Main="FF FF FF A0"
GW_Main="133.144.22.10"
SN_Main=(SN_Sub1,SN_Sub2)
GW_Main=(GW_Sub11,GW_Sub2)
(SN_Main GW_Main)=   (    (SN_Sub1,GW_Sub1)
                      AND (SN_Sub2,GW_Sub2))
                OR (    (SN_Sub1,GW_Sub2)
                      AND (SN_Sub2,GW_Sub1))

(6) EXPANSION RESULT OF RULE (5) BY USING DATA OF DATA OF SENSOR NODE CONSTRUCTION MANAGEMENT TABLE AND GATEWAY CONSTRUCTION MANAGEMENT TABLE ~2506

(SN,GW)= (FF FF FF A0,133.144.22.10)
       =   (    (FF FF FF A1,133.144.22.11)
             AND (FF FF FF A2,133.144.22.12))
         OR (    (FF FF FF A1,133.144.22.12)
             AND (FF FF FF A2,133.144.22.11))

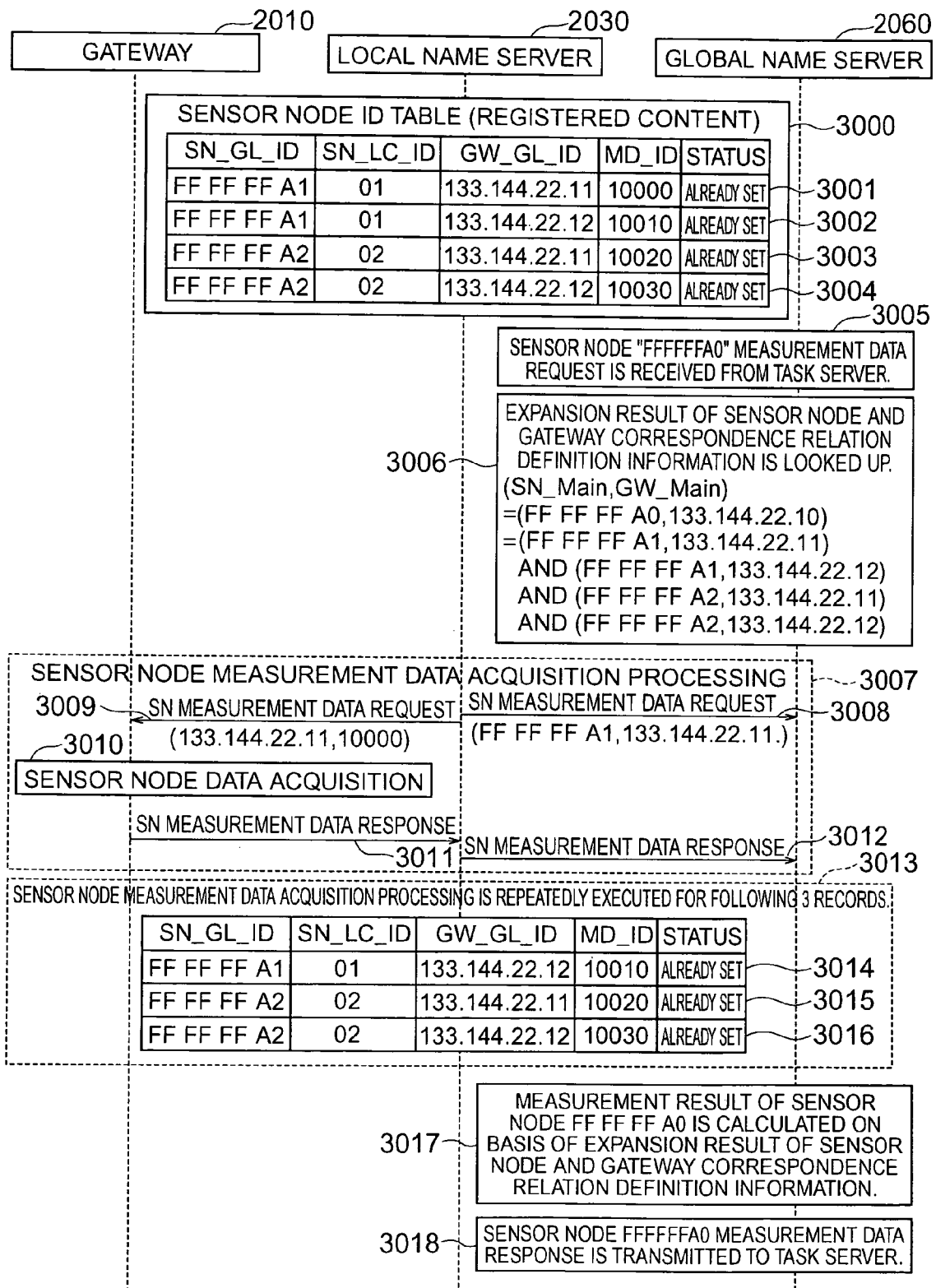

SENSOR NETWORK MANAGEMENT SYSTEM

INCORPORATION BY REFERENCE

The present application claims priority from Japanese application JP2005-044940 filed on Feb. 22, 2005, the content of which is hereby incorporated by reference into this application.

BACKGROUND OF THE INVENTION

This invention relates to an information processing system including information processing terminals each having a wireless communication function, wireless base stations for executing wireless communication with the information processing terminals and information processing servers connected to the wireless communication base stations through a network. In a sensor network information processing system including the information processing terminals described above each of which a sensor for measuring a state of a matter, the invention relates more specifically to a sensor network management system for managing an operating condition of sensor nodes.

A ubiquitous information society that makes it possible to provide an optimum information service in accordance with a condition and an environment in which a matter is placed without the limitation of time and space has gradually been realized at present. Particularly, ubiquitous information processing devices using secure IC chips typified by IC cards and wireless tags (RFID) have become widespread, too, and a variety of application services including electronic settlement, physical distribution management, security management and information provision services have now been attempted.

With the background described above, development of a sensor network system including a ubiquitous information processing device (hereinafter called "sensor node") accessorial to people or an article, for measuring the condition of the matter and an information processing server (hereinafter called "task server") for executing various kinds of task processing by inputting the outputs of the sensor nodes has been made. Whereas wireless tags according to the prior art provide only individual identification information, the sensor nodes can provide various conditions of the matter and may be applied to high-level task services.

The ubiquitous information processing terminal described above cannot execute a task by itself and must operate in the interlocking arrangement with a task processing program on a server. On the contrary, the server acquires necessary information from a large number of ubiquitous information processing terminals and can execute the task. Because the ubiquitous information processing terminal is allowed to accompany the real matter and operate, it is very important that the terminal is allowed to accompany the correct matter and to monitor and manage its operating condition.

As for IC cards that have become widespread as the ubiquitous information processing device, the management system specification ranging from the issuance to operation are determined in the Global Platform: Global Platform Smart Card Management System Functional requirements Version 4.0, 21 Dec. 2004 and Global Platform: A Primer to the Implementation of Smart Card Management and Related Systems, Version 1.0, October 2000.

SUMMARY OF THE INVENTION

Various methods are available for the construction of the sensor network system but the common feature is that the system is allowed to operate accessorial to the real matter. The necessity for a sensor network operation management system and its problems will be explained on the basis of this feature.

First, the necessity of the sensor network operation management system will be explained. The explanation will be given on an example of a task of a sensor node having a temperature sensor when the body temperature of a user is measured and is recorded. To accomplish this task system, it is necessary to install the sensor nodes for the users and to correctly grasp which sensor starts operating from what time for which user. It is the sensor network management system that executes this management. The sensor node can be equipped with a plurality of sensors and may be used for a plurality of different tasks. In the case of a single sensor such as the temperature sensor, there is the possibility that the information measured is used for a plurality of different tasks. Consequently, it is believed desirable that the sensor network management system be capable of grasping the operating conditions of the sensor nodes and managing them as an independent system that is independent of discrete task applications.

Next, the problems to be solved in the sensor network management system will be explained. Two problems can be mentioned as the problems of the sensor network system. The first problem is how the task program can easily look up the condition or the attribute value of a matter as a measurement object. In the case of the body temperature measurement task of a user, for example, reference from the attribute program can preferably be described as "body temperature of user ID No. 2004IT10" rather than "measurement temperature of sensor node ID No. FFEEDD11". The second problem is how to accomplish failure-proofing of the sensor network system. If two sensor nodes are arranged for one matter, for example, one of the sensor nodes can replace the other when the other is out of order. When both of the two sensor nodes are normal, the measurement value of either one of them may well be used. (Alternatively, the logical "AND" of the measurement values of the two sensor nodes may be calculated and used). To accomplish this object, the operation management system must virtually manage and regard a plurality of sensor nodes as a single sensor node.

To sum up, the sensor network system is the one that looks up on the real time basis the conditions of matters of the real world and executes the task processing by using the value as the input. The problems that the invention is to solve are to constitute a sensor network management system that enables a task program inputting measurement data of sensor node as an input to easily look up the condition of a matter as a measurement object and to furnish the task program with a failure-proofing property.

To accomplish the object described above, the invention provides a first computer system including wireless terminals, wireless base stations connected to the wireless terminals through a first wireless communication network and a name server computer and a task server computer connected to the wireless base stations through a second communication network, wherein each wireless terminal includes storage means for storing a global identifier uniquely designated inside the computer system and a local identifier uniquely designated inside the range of the wireless base station; each wireless base station includes local identifier allocation means for allocating the local identifier on the basis of the global identifier, relay service means having a protocol gateway function that makes the wireless terminal connected to the first wireless communication network accessible from the task server computer connected to the second communication network, and wireless terminal management means for managing a correspondence relation between the local identifier allocated to each wireless terminal and the relay service; the name server computer includes relay service management means for managing a correspondence relation among the global identifier inside the wireless terminal, the identifier of the wireless base station and the identifier of the relay service; when the wireless terminal exists inside the communication range of the wireless base station, the wireless base station allocates the local identifier to the wireless terminal by using the local identifier allocation means and the relay service corresponding to the wireless terminal, and executes registration management of the correspondence relation of the allocated local identifier and the allocated relay service with respect to the wireless terminal management means; and the name server executes registration management of the correspondence relation of the set of the global identifier of the wireless terminal, the identifier of the wireless base station and the identifier of the allocated relay service.

In the first computer system described above, when the task server transmits a wireless terminal reference request to the name server by using the global identifier of the wireless terminal, the name server computer converts the global identifier of the wireless terminal to the relay service identifier by using the relay service management means and converts the wireless terminal reference request to the relay service reference request.

To accomplish the objects described above, the invention provides a second computer system constituted by wireless terminals, wireless base stations connected to the wireless terminals through a first wireless communication network, and a name server computer and a task server computer connected to the wireless base stations through a second communication network, wherein each wireless terminal includes storage means for storing a wireless terminal global identifier uniquely designated inside the computer system, a wireless terminal local identifier uniquely designated within the range of the wireless base station and a later-appearing wireless base station local identifier of the wireless base station; the wireless base station includes wireless terminal local identifier allocation means for allocating the wireless base station global identifier uniquely designated inside the computer system and the wireless terminal local identifier on the basis of the wireless terminal global identifier, relay service means having a protocol gateway function for making the wireless terminal connected to the first wireless communication network accessible from the task server computer connected to the second communication network and wireless terminal management means for managing a correspondence relation between the wireless terminal local identifier allocated to each wireless terminal and the relay service; the name server computer includes wireless base station local identifier allocation means for allocating the wireless terminal local identifier on the basis of the wireless base station global identifier and relay service management means for managing a correspondence relation among the wireless terminal global identifier inside the wireless terminal, the wireless base station global identifier and the identifier of the relay service; when the wireless terminal exists inside the communication range of the wireless base station, the wireless base station allocates the wireless terminal local identifier to the wireless terminal by using the wireless terminal local identifier allocation means, further allocates the relay service corresponding to the wireless terminal and executes registration management of the correspondence relation between the allocated wireless terminal local identifier and the allocated relay service by using the wireless terminal management means; the name server computer allocates the wireless base station local identifier to the wireless base station by using the wireless base station local identifier allocation means, and executes registration management of the correspondence relation among the global identifier of the wireless terminal, the global identifier of the wireless base station and the allocated identifier of the relay service; the wireless base station stores and manages the wireless base station local identifier so allocated; and the wireless terminal stores and manages the allocated wireless terminal local identifier and the allocated wireless base station local identifier.

In the second computer system described above, the wireless terminal transmits the allocated wireless base station local identifier at the time of communication with the wireless base station; the wireless base station again allocates a new wireless terminal local identifier to the wireless terminal by using the wireless terminal local identifier allocation means when the wireless base station local identifier received is different from the wireless base station local identifier allocated thereto, again allocates a new relay service corresponding to the wireless terminal and executes updating registration management of a correspondence relation of the wireless terminal local identifier again allocated and the new relay service again allocated; the name server allocates a new wireless base station local identifier to the wireless base station by using the wireless base station local identifier allocation means, and executes updating registration management of a correspondence relation of the global identifier of the wireless terminal, the global identifier of the wireless base station and the identifier of the new relay service again allocated with respect to the relay service management means for the relay service management means; the wireless base station executes updating storage management of the wireless base station local identifier again allocated; and the wireless terminal executes updating storage management of the wireless terminal local identifier again allocated and the wireless base station local identifier again allocated.

In the first or second computer system described above, the name server computer manages a correspondence relation between an entity identifier of a matter by which the wireless terminal is accompanied and the wireless terminal global identifier by entity management means; and when a task service inside the task server computer looks up the wireless terminal by using the entity identifier of the matter by which the wireless terminal is accompanied, the task service sends the entity identifier to the name server computer and asks identifier solution, and the name server computer asked for the identifier solution retrieves the wireless terminal global identifier from the entity management means by using the entity identifier accompanying the request, retrieves the relay service identifier from the relay service management means by using the wireless terminal global identifier retrieved, and sends the relay service identifier to the task service as a response.

In first computer system including wireless terminals, wireless base stations connected to the wireless terminals through a first wireless communication network, and a name server computer and a task server computer connected to the wireless base stations through a second communication network, the name server computer includes a wireless terminal combination rule for combining a plurality of wireless terminals so that they can be looked up as a logically single wireless terminal, and wireless terminal combination rule management means for managing the wireless terminal combination rule; a wireless base station combination rule for combining a plurality of wireless base stations so that they can be looked up as a logically single wireless base station, and wireless base station combination rule management means for managing the wireless base station combination rule; a wireless terminal and wireless base station combination rule for combining a plurality of wireless terminals and a plurality of base stations so that they can be looked up as a correspondence relation constituted by a logically single wireless terminal and wireless base station, and wireless base station combination rule management means for managing the wireless terminal and wireless base station combination rule; and wireless terminal and wireless base station combination control means for interpreting a reference request to the logically single wireless terminal by using the wireless terminal combination rule, the wireless base station combination rule and the wireless terminal and wireless base station combination rule, deciding the combination of a plurality of wireless terminals and a plurality of wireless base stations, sending the wireless terminal reference request to the combination so decided, receiving the result of the reference request sent, and generating the result of the reference request to the logically single wireless terminal by combining the result information received in accordance with the interpretation described above.

Another aspect of the invention will be explained. The invention provides a communication method of a computer system including a plurality of terminals, a plurality of base stations communicating with the terminals through a first network and a server communicating with the base stations through a second network, wherein each terminal has a memory for storing a terminal identifier for identifying the terminal itself; each base station has a memory for storing a terminal identifier of the terminal with which the base station communicates and a relay identifier in association with each other; the server has a memory for storing in association with one another the identifier of the base station, and the terminal identifier and the relay identifier that are stored in association with each other; when communication is made with a specific terminal from inside any part of the second network, the memory of the server is retrieved and the relay identifier is sent to the base station on the basis of the relay identifier associated with a terminal identifier representing the specific terminal and the identifier of the base station; and the base station retrieves the memory on the basis of the relay identifier received and gains access to the terminal having the terminal identifier associated with the relay identifier. Because the communication is made in this way at the base station through the relay identifier, the access from any part inside the second network to the base station and the access from the base station to the terminal can be made with different identifiers. Consequently, the identifiers can be set arbitrarily and freedom of the system configuration can be improved.

Furthermore, the terminal has a memory for storing a first terminal identifier primarily designating itself inside the computer system in association with a second terminal identifier primarily designating itself in the base station with which the terminal communicates; the base station has a memory for storing the first and second terminal identifiers of the terminal with which the base station communicates and the relay identifier in association with one another; the server has a memory for storing in association with one another the identifier of the base station, the first terminal identifier and the relay identifier stored in the base station in association with one another; when communication is made with a specific terminal from inside any part of the second network, the memory of the server is retrieved and the relay identifier is sent to the base station on the basis of the relay identifier associated with a first terminal identifier representing the specific terminal and the identifier of the base station; and the base station retrieves the memory on the basis of the relay identifier received and gains access to the terminal having the second terminal identifier associated with the relay identifier. Here, when the first terminal identifier is a global ID and an identifier shorten than the global ID is used as the second terminal identifier, for example, the traffic of information and power consumption of the terminals can be effectively reduced.

The system for this purpose includes a plurality of terminals, a plurality of base stations communicating with the terminals through a first network and a server communication with the base stations through a second network, wherein each terminal has a memory for storing a terminal identifier for identifying the terminal itself; each base station has a memory for storing a terminal identifier of the terminal with which the base station communicates and a relay identifier in association with each other; and the server has a memory for storing the identifier of the base station, and the terminal identifier and the relay identifier stored in association with each other in the base station, in association with one another.

In a server of a computer system including a plurality of terminals each having a memory for storing a terminal identifier for primarily designating the terminal itself, a plurality of base stations each communicating with the terminal through a first network and having a memory for storing the terminal identifier of the terminal with which it communicates and a relay identifier in association with each other, and a server communicating with the base stations through a second network, the server includes a memory for storing in association with one another the identifier of the base station, and the terminal identifier and the relay identifier stored in association with each other in the base station. When an access is made to the terminal from the second network, the access request based on the terminal identifier is converted to the access request based on the relay identifier inside the server, and the access is made to the terminal by sending the relay identifier to the base station.

In a base station in a computer system including a plurality of terminals each having a memory for storing a terminal identifier for primarily designating the terminal itself, a plurality of base stations each communicating with the terminal through a first network and a server communicating with the base stations through a second network and storing in association with one another the identifier of the base station, and the terminal identifier and the relay identifier stored in association with each other in the base station, in association with one another, the base station according to the invention has a memory for storing the terminal identifier of the terminal with which it communicates, and the relay identifier in association with each other. When the relay identifier is received from the second network in this base station, the access is made to the terminal designated by the terminal identifier associated with the terminal.

The functions described above can be materialized by allowing CPU provided to each of the terminal, the base station and the server to execute respective software. The software can be constituted by arbitrary functional blocks. The software can also be constituted by dedicated hardware. Various kinds of identifiers can be stored in tables of storage units (memories) provided to each of the terminal, the base station and the server.

In the sensor network system for transferring the measurement information obtained by using the sensor node through the network and executing the task application on the host computer, the invention makes it possible for the task program inputting the measurement data of the sensor node to effectively look up the attribute information by using the identification number of the matter (entity) of the measurement object without using the identification number of the sensor node. The attribute information of the entity can be transmissibly looked up without using the sensor network system when the matter of the measurement object moves, too. Furthermore, the invention makes it possible to constitute a sensor network system having failure-proofing property that can consecutively execute the processing of the system as a whole even when a part of the sensor node constituting the sensor network system is out of order.

In the production and distribution stages of products, each product is accompanied by the sensor node to freely measure various physical quantities such as temperature, impact, position information, and so forth. The physical quantities so measured are transferred from the sensor node to the host computer through the network. On the other hand, the host computer executes various kinds of business processing such as production management and inventory management by inputting the measurement information from the sensor node and can improve the production factor and physical distribution efficiency.

The system of the invention can be applied to a variety of task applications such as monitoring and environmental control by expanding the measurement object of the sensor node to the environment such as people, rooms, and so forth.

Other objects, features and advantages of the invention will become apparent from the following description of the embodiments of the invention taken in conjunction with the accompanying drawings.

BRIEF DESCRIPTION OF THE DRAWINGS

FIG. 4 is a structural view of a sensor node ID table;
FIG. 7 is a structural view of a sensor node management table;
FIG. 8 is a structural view of an entity management table;
FIG. 10 is a structural view of an entity attribute information management table;
FIG. 24 is a structural block view of a global name server;
FIG. 25 shows an example of correspondence relation definition information of a sensor node and a gateway;
FIG. 26 shows an example of correspondence relation definition information of a sensor node and a gateway (continuation);
FIG. 32 is a sequence view of a sensor node registration processing.

DESCRIPTION OF THE EMBODIMENTS

Embodiment 1

Figure 1:
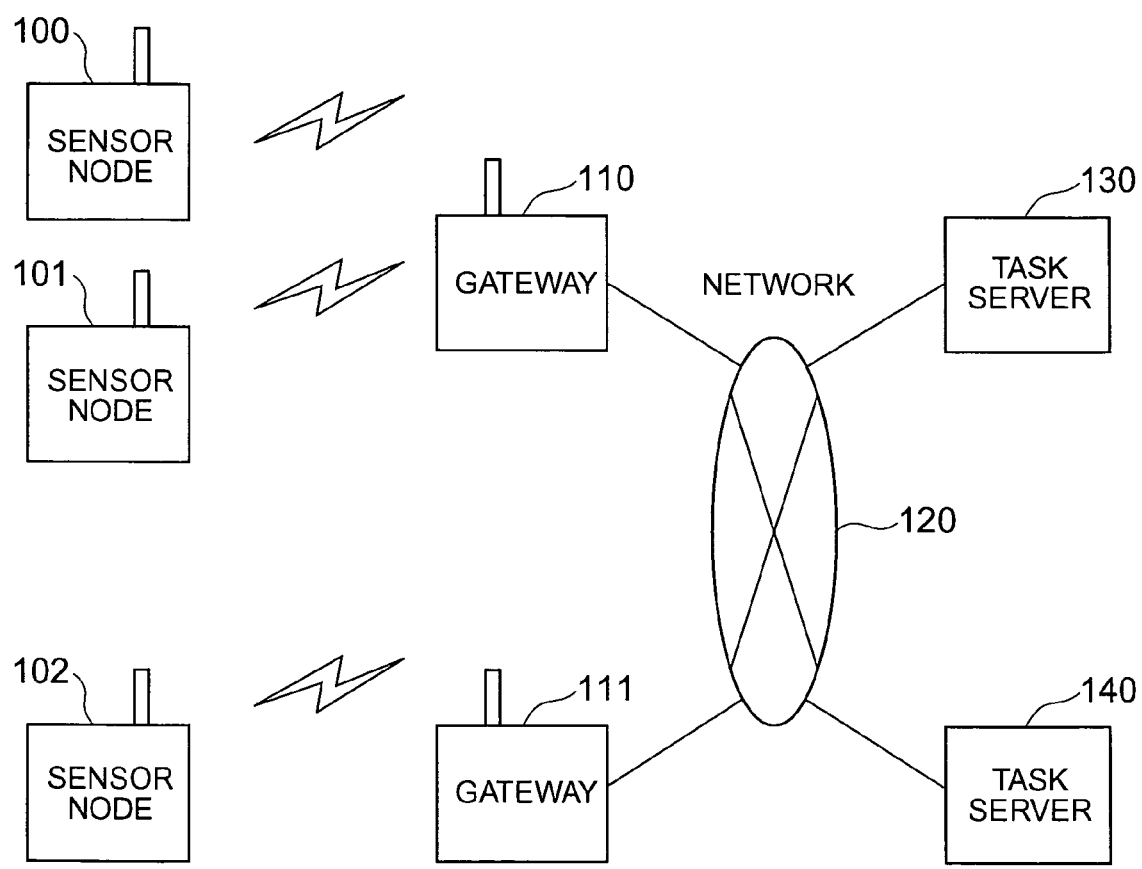
FIG. 1 is a system structural view of a sensor network system.

FIG. 1 shows an overall construction of a sensor network system according to the first embodiment of the invention. The sensor network system includes a plurality of sensor nodes (100, 101, 102), gateways (110, 111), a network (120), a name server (130) and a task server (140).

Each of the sensor nodes (100, 101, 102) is a terminal computer that has a wireless communication function, measures various kinds of information by using a built-in sensor and exchanges a variety of electronic data containing the measurement information with the gateway (110,111) through the wireless communication function. The gateway (110, 111) is a wireless communication base station computer that has a wireless communication function and an ordinary network communication function typified by the Internet and accomplishes a data conversion processing function between the two different communication protocols described above. The network (120) is a local area network or wide area network typified by the Internet. The name server (130) is an ordinary server computer that manages the relation among a sensor node identifier, an identifier of a matter (entity) to which a sensor node is attached and an identifier of the wireless communication base station computer communicating with the sensor node and accomplishes a name service function responding to the relational information in accordance with an inquiry. The task server (140) is a server computer for executing a task application. The task server (140) asks the name server (130) a name solution of the entity identification information for referring to the sensor data of the entity as the measurement object through the network, gains access to the gateway (110, 111) by using the solution result and acquires the actual sensor data.

The explanation given above explains the overall construction of the sensor network system according to the invention. Next, each system constituent element will be explained in further detail.

Figure 2:
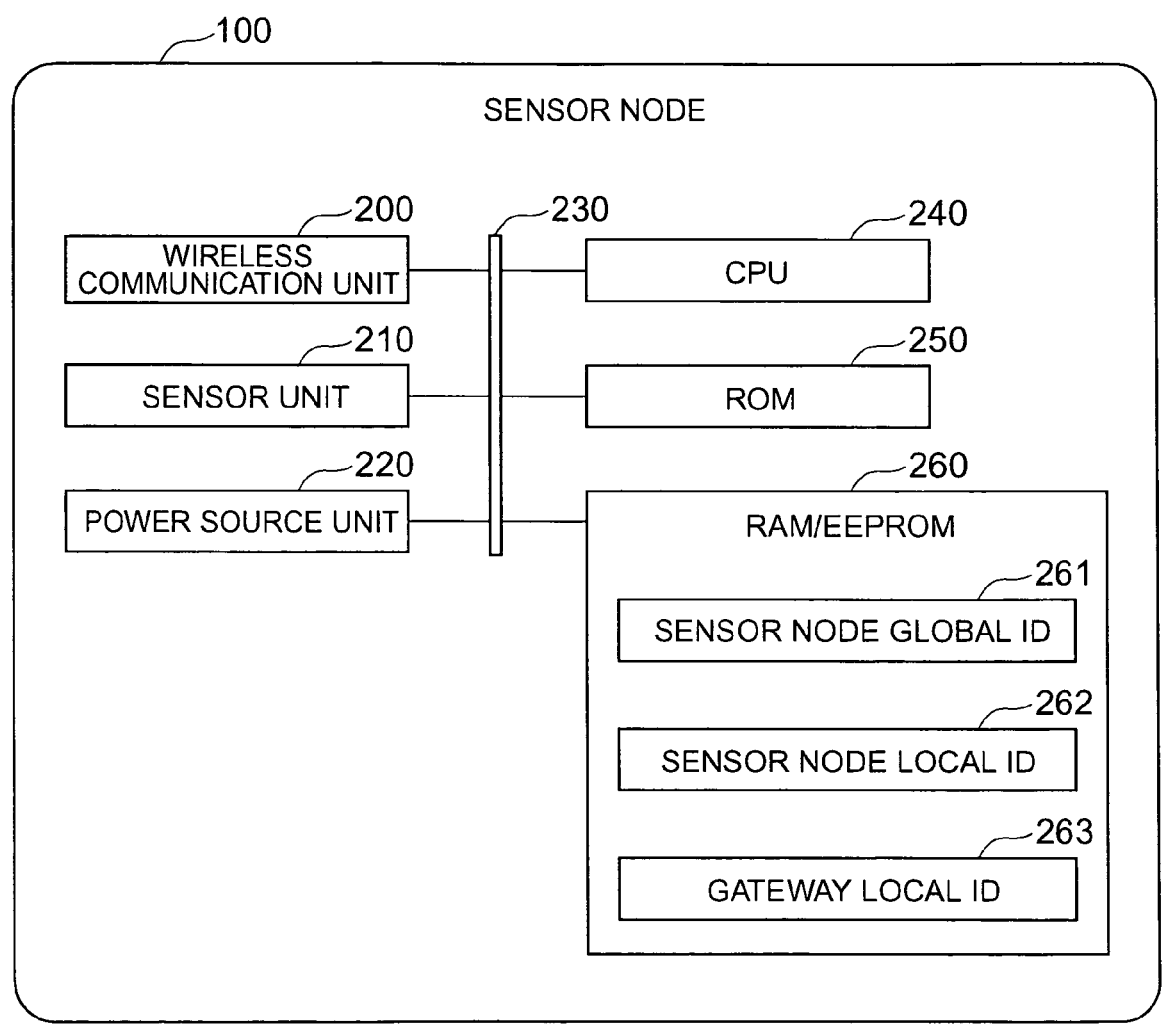
FIG. 2 is a structural block view of a sensor node.

FIG. 2 shows an example of the construction of each sensor node (100, 101, 102). As shown in the drawing, the sensor node has a construction analogous to that of an ordinary built-in type computer with the exception that it has a sensor unit (210) built therein. A wireless communication unit (200) provides the functions of wireless communicating various kinds of command information and measurement data measured by the sensor node with outside. The sensor unit (210) provides the function of measuring various physical quantities (such as temperature, strain, sound, vibration, position, etc), for example. A power source unit (220) provides the function of providing a power source for driving the sensor node. The sensor node preferably operates with low power consumption as can be estimated from the mode of its utilization and is preferably a power source unit having high efficiency. A CPU (240) is a central processing unit and executes programs for executing a basic management software (OS: operating system) of the sensor node and a sensing processing. An ROM (250) is a read-only memory and stores the OS and a program code of the sensing processing described above. An RAM/EEPROM (260) is a volatile/non-volatile rewritable memory and provides a temporary storage area that becomes necessary when executing the OS and the sensing processing program described above. Each of these units is connected through an internal bus (230).

The EEPROM (260) stores the following three identification numbers (ID numbers) as the feature of the sensor node of this embodiment. The first sensor node global ID (261) is an identification number capable of globally specifying the sensor node. This ID number is the one and only identification number that is set at the time of production or immediately after the production of the sensor node and remains unchanged throughout the life cycle of the sensor node.

Next, a sensor node local ID (262) is an identification number of the sensor node temporarily allocated by the gateway. The sensor node local ID is a temporal identification number that is set at the point of time at which communication is first made with the gateway having the sensor node and is so limited as to remain valid both time-wise and spatially until communication is made with other gateways. As a result, the sensor node local ID (262) is preferably expressed by a smaller information quantity than the sensor node global ID (261). Because the sensor node preferably operates with low power consumption as described above, the communication data quantity between the sensor node and the gateway is preferably as small as possible. Power necessary for the communication can be reduced by using the sensor node local ID (262) in place of the sensor node global ID (261) as the identification information of the sensor node.

Finally, the gateway local ID is a temporal identification number of the gateway while the sensor node is under communication. When the sensor node makes communication while moving between the gateways as will be later described, this ID is used as a trigger for the gateway to recognize the start of the communication with another gateway. The explanation of the construction of the sensor node is thus finished.

Figure 3:
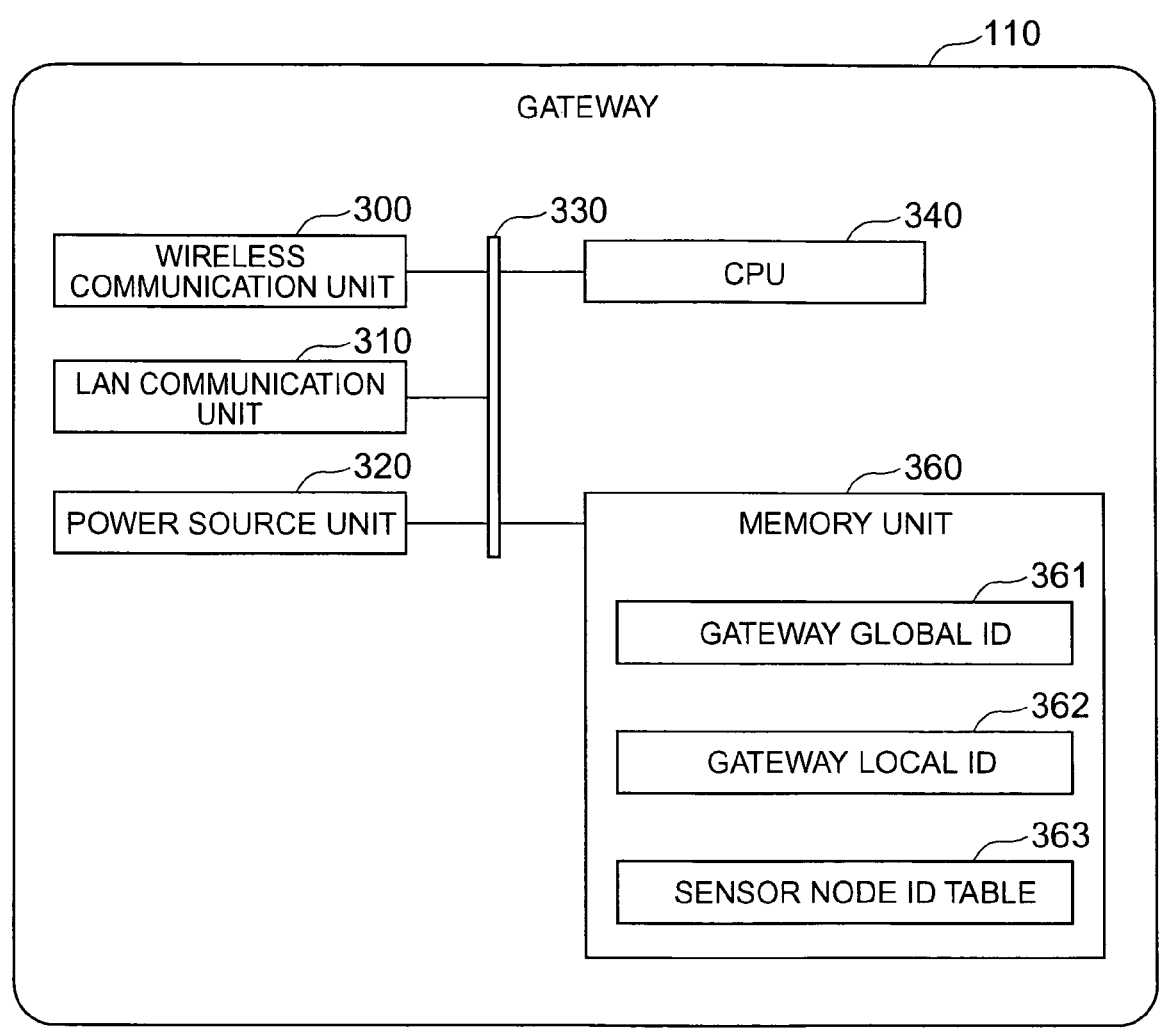
FIG. 3 is a structural block view of a gateway.

FIG. 3 shows an example of the construction of the gateway (110, 111). As shown in the drawing, the gateway is a wireless communication base station computer that includes a wireless communication unit (300) and an LAN communication unit (310). The wireless communication unit (300) provides the functions of communicating various kinds of command information and wireless communication of physical data measured by the sensor node. The LAN communication unit (310) is a network interface and provides a network communication function typified by the Internet. A power source unit (320) provides the function of supplying a power source for driving the gateway. A CPU (340) is a central processing unit that executes a basic management software (OS: operating system) of the gateway and a protocol conversion processing program between the wireless communication protocol and the network communication protocol. An RAM/EEPROM (360) is a volatile/non-volatile rewritable memory that stores the OS and a program code of the protocol conversion processing described above and provides a temporary storage area necessary for executing the OS and the sensing processing program. Each of the units described above is connected by the internal bus (330).

Furthermore, the EEPROM (360) stores the following three identification numbers (ID numbers) as the feature of the gateway of this embodiment.

To begin with, the first gateway global ID (361) is an identification number capable of globally identifying the gateway. This ID number is the one and only identification number and is set when the gateway is connected to the network. An IP address in the Internet is a concrete example of this ID.

Next, a gateway local ID (362) is an identification number of the gateway temporarily allocated by the name server. The gateway local ID is a temporal identification number that is set at the point of time when the sensor node in which the gateway exists is registered to the name server. The gateway local ID (362) is preferably expressed with a smaller information quantity than the gateway global ID (361). Because the sensor node preferably operates with low power consumption as described above, the communication data quantity between the sensor node and the gateway is preferably as small as possible. The sensor node holds the gateway local ID (362) in place of the gateway global ID (361) as the identification information of the gateway during its communication and sends the gateway local ID to the communication data. The gateway can recognize that the sensor node moves and comes to the communication area of the gateway from the communication area of a different gateway when the gateway checks the gateway local ID of the communication data of the sensor node and knows that is different from the gateway local ID of its own.

Finally, a sensor node ID table (363) is a table of sensor nodes while the gateway is under communication.

As shown in FIG. 4, each record in the sensor node ID table (363) has three constituent elements, that is, a sensor node global ID (400), a sensor node local ID (401) and a gateway intermediate service ID (402). The sensor node global ID (400) and the sensor node local ID (401) have already been explained. It is to be noted, however, that generation of the sensor node local ID is executed by the gateway (110). The gateway intermediate service is a gateway program of an application layer that is executed on the gateway (110). The main function of the gateway intermediate service is the provision of means for gaining access to the sensor node from the task service on the task server connected to the IP network side through the IP network interface. This service is packaged as an RPC (Remote Procedure Call) processing program in a distributed computing environment as represented by CORBA (Common Object Request Broker Architecture) and SOAP (Simple Object Access Protocol). The sensor node access request described by the IP interface is subjected to protocol conversion by this gateway intermediate service and is transmitted as the sensor node access request described by the wireless communication interface to the sensor node. The gateway intermediate service provides the virtual IP interface of the sensor node as described above. Generation/extinction of the gateway intermediate service is dynamically executed. In other words, when the sensor node enters the communication rage of the gateway and the communication processing is started between them, the gateway intermediate service corresponding to the sensor node is created. Similarly, the gateway relay service is extinguished when the sensor node comes off from the communication range of the gateway and starts communication with other gateway as the trigger. Referring to FIG. 4, two sensor nodes (410, 411) are shown registered to the sensor node ID table. The explanation of the construction of the gateway is thus finished.

Figure 5:
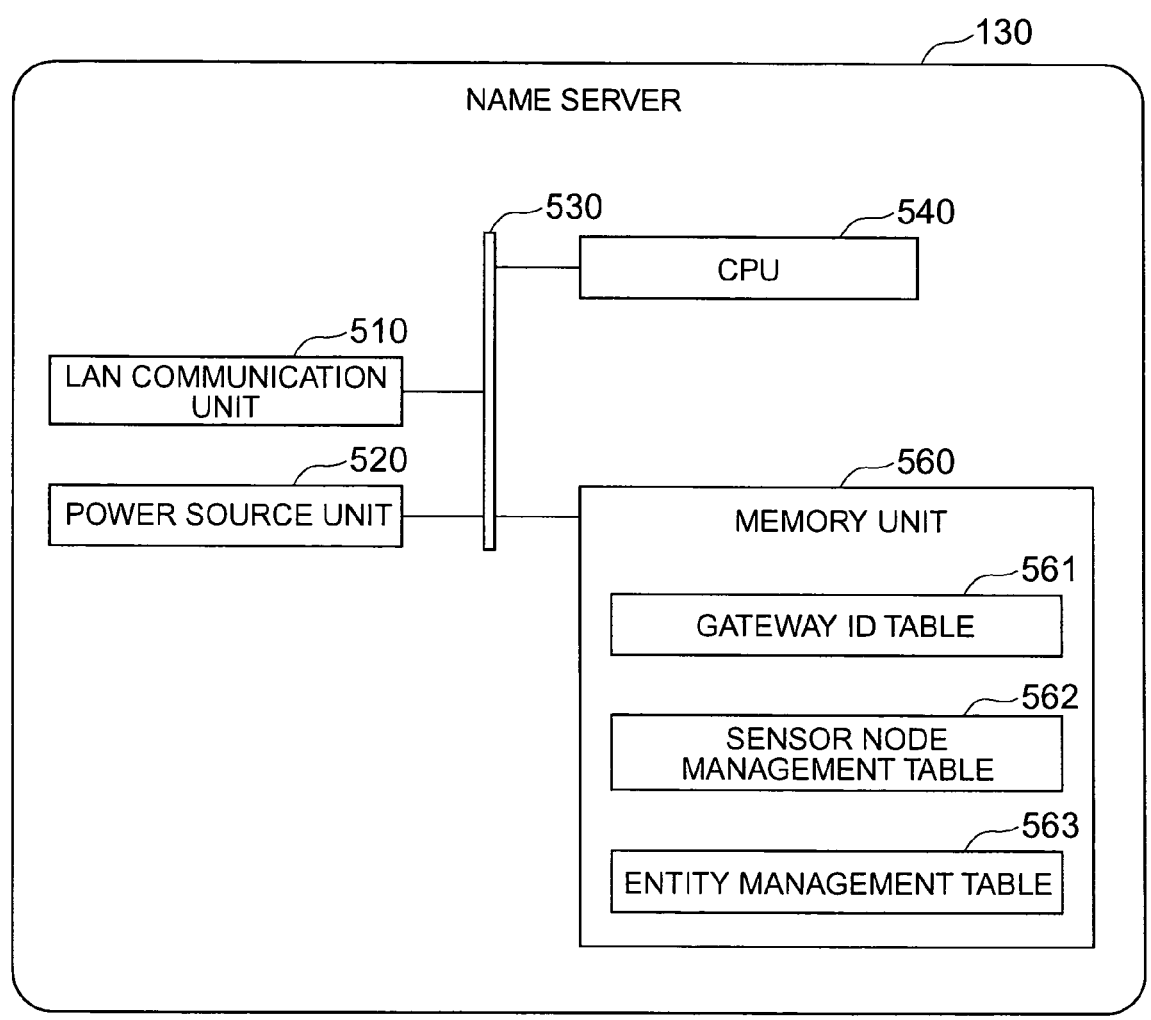
FIG. 5 is a structural block view of a name server.

FIG. 5 shows an example of the construction of the name server (130). The name server is a server computer having an LAN communication unit (510) as shown in the drawing. The LAN communication unit (510) is a network interface and provides a network communication function typified by the Internet. A power source unit (520) provides the function of supplying a power source for driving the name server. A CPU (540) is a central processing unit that executes a basic management software (OS: operating system) of the name server and an address solution program. An RAM/EEPROM (560) is a volatile/non-volatile rewritable memory that stores the OS and a program code for an address solution processing and provides a temporary storage area that becomes necessary for executing the OS and the address solution processing. Each of the units described above is connected through an internal bus (530).

Furthermore, the RAM/EEPROM (560) stores the following three information tables as the feature of the name server of this embodiment.

To begin with, the gateway ID table (561) manages the ID of all the gateways the sensor nodes of which are registered to the name server.

Figure 6:
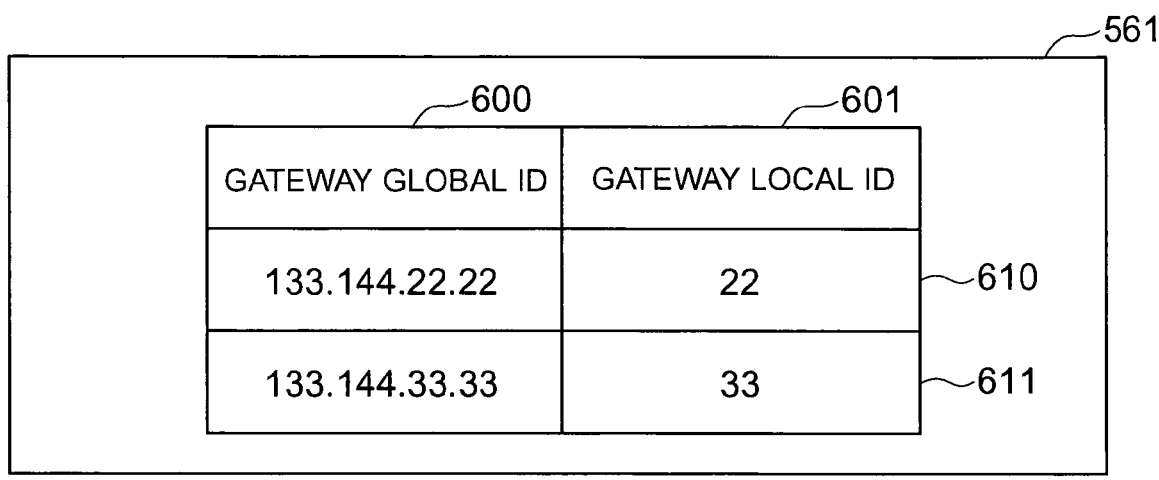
FIG. 6 is a structural block view of a gateway.

FIG. 6 shows an example of the gateway ID table (561). Each record of the gateway ID table (561) includes a pair of a gateway global ID (600) and a gateway local ID (601) as shown in the drawing. In other words, the name server (130) generates a gateway local ID corresponding to each gateway for the gateway the sensor of which is registered and manages the correspondence with the gateway global ID. In FIG. 6, two gateways (610, 611) are shown registered to the gateway ID table.

Next, the sensor node management table (562) manages with which gateway each sensor node communicates and the gateway relay service ID in that gateway manages something.

FIG. 7 shows an example of the sensor node management table (562). As shown in the drawing, each record of the sensor node management table (562) includes a set of the sensor node global ID (700), the gateway global ID (701) and the gateway intermediate service ID (702). In other words, this table manages the correspondence of the IP interface of the gateway intermediate service as the virtual IP interface of each sensor node. In FIG. 7, two gateway intermediate services (710, 711) are shown registered to the sensor node management table.

Finally, an entity management table (563) manages the correspondence between an entity ID that represents an entity of a real world in which the sensor node is installed and the sensor node.

FIG. 8 shows an example of the entity management table (563). As shown in the drawing, each record of the entity management table (563) includes a pair of an entity ID (800) and a sensor node global ID (801). In other words, this table enables address solution of identification information when the sensor node for observing the attribute information of the entity of the real world is concealed and the information is looked up by using the entity of the real world as the identifier. In FIG. 8, two entities (810, 811) are registered to the entity management table with one each sensor node set to the entity. The explanation of the construction of the name server is thus finished.

Figure 9:
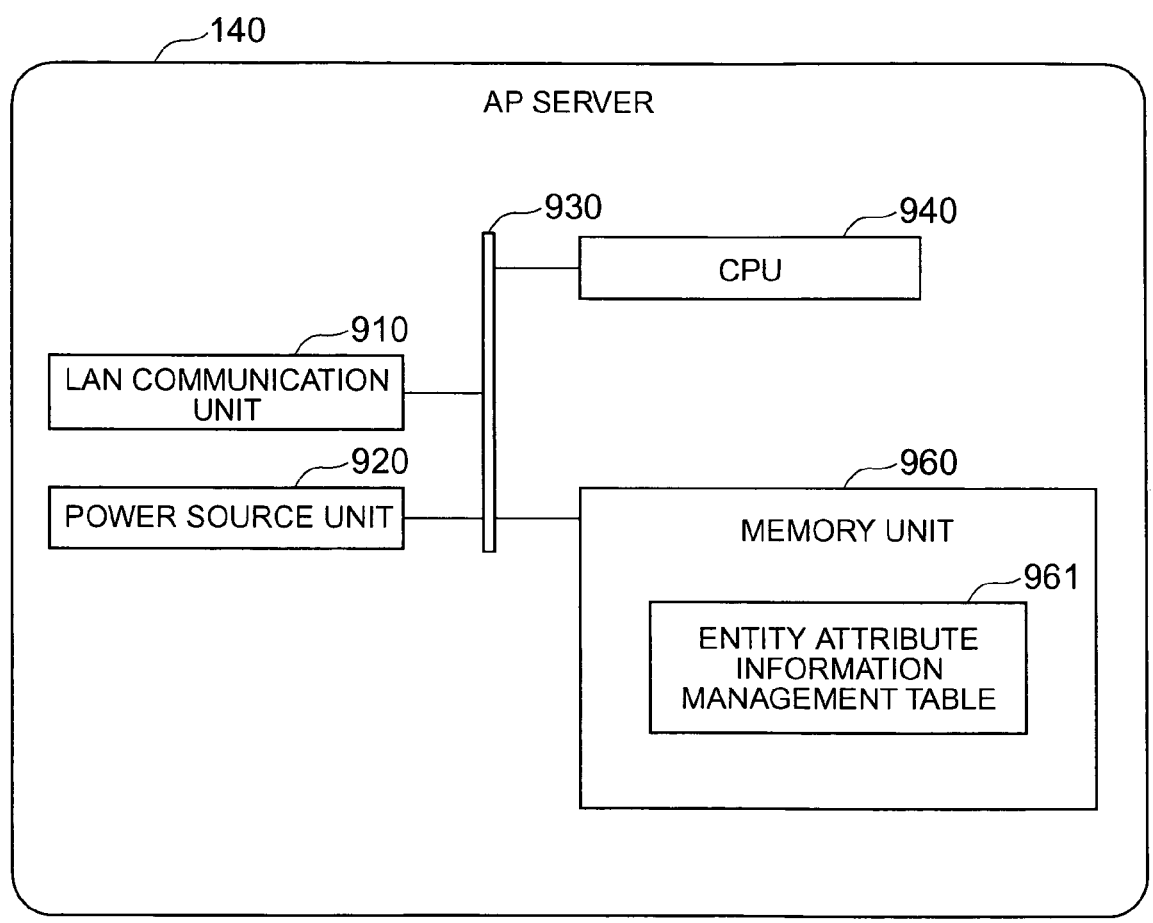
FIG. 9 is a structural block view of a task server.

FIG. 9 shows an example of a construction of a task server (140). The task server is a server computer having an LAN communication unit (910) as shown in the drawing. The LAN communication unit (910) is a network interface and provides the network communication function typified by the Internet. A power source unit (920) provides the function of supplying a power source for driving the task server. A CPU (940) is a central processing unit that executes a basic management software (OS: operating system) of the task server and a task service program. An RAM/EEPROM (960) is a volatile/non-volatile rewritable memory that stores the OS and a program code for task service processing and provides a temporary storage area that becomes necessary for executing the OS and the task service processing. Each of the units described above is connected through an internal bus (930).

As an example of the feature of the task server according to this embodiment, the RAM/EEPROM (560) further stores an entity attribute information table (961).

As for each entity of the real world, the entity attribute information table (961) is table information representing which basic attribute information the entity has and unique to the task service for storing the physical information measured by the sensor node.

FIG. 10 shows an example of a construction of the entity attribute information table (961). As shown in the drawing, each record of the entity attribute information table (961) has a set of an entity ID (1000), basic attribute information (1001) and sensor attribute information (1002). In other words, this table manages the observation of the sensor attribute (body temperature: 36.5° C. in the example in FIG. 10) of the basic attribute information (date: 2004, Aug. 1, 10 hr:25 min:42 sec, a.m. in FIG. 10) of a user (staff number 2004IT10 in FIG. 10) as the entity of the real world. Referring to FIG. 10, another entity (1011) is registered to the entity attribute information management table. The explanation of the construction of the task server is thus finished.

Next, the processing sequence in the sensor net system described above will be explained. The processing sequence includes the following thee kinds of processing:
(1) initial registration processing of sensor node;
(2) measurement data transmission processing of sensor node in communication area of registered gateway; and
(3) measurement data transmission processing of sensor node when sensor node enters communication area of non-registered gateway from registered gateway.

Each processing sequence will be explained with reference to the drawings.

Figure 11:
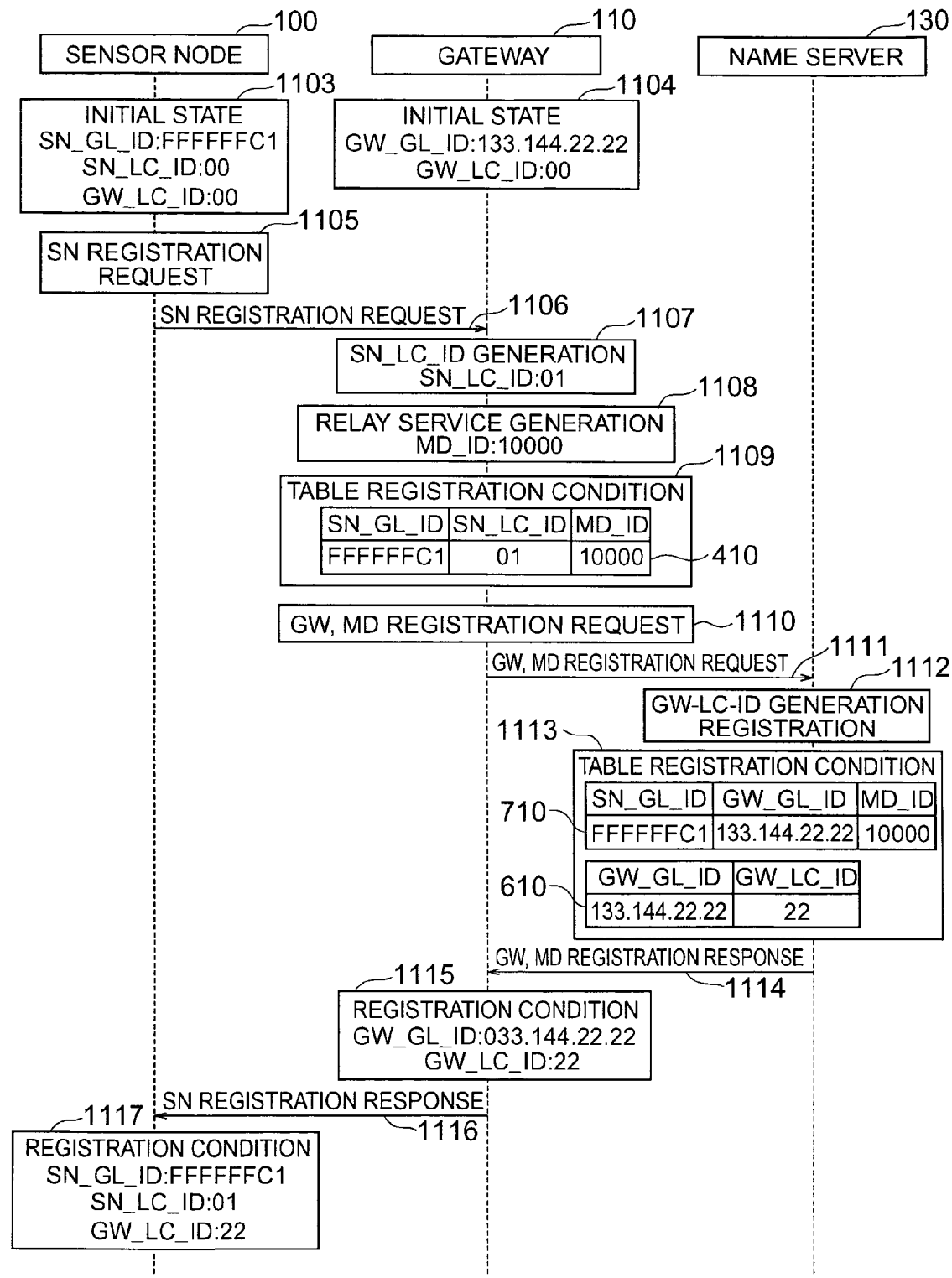
FIG. 11 is a sensor node registration processing sequence diagram.

The first processing sequence, that is, "(1) initial registration processing of sensor node", will be explained with reference to FIG. 11. Under the initial state (1103) of the sensor node (100), the sensor node global ID (SN_GL_ID) is a value ("FFEEDDC1") that is set at the time of production, and the sensor node local ID (SN_LC_ID) and the gateway local ID (GW_LC_ID) are values ("00") representing non-set. Next, under the initial state (1104) of the gateway (110), the gateway global ID (GW_GL_ID) is a value ("133.144.22.22") that is set at the time of the network connection of the gateway, and the gateway local ID (GW_LC_ID) is a value ("00") representing non-set.

Entering the operating condition, the sensor node (100) detects that its sensor node local ID (SN_LC_ID) is not set, and sends the following sensor node registration request (1106) to the gateway (110) (1105).

SN Registration Request (Argument: SN_GL_ID)

Receiving the sensor node registration request (1106), the gateway (110) generates the sensor node local ID (SN_LC_ID="01") to be allocated to the sensor node (1107). Next, it generates a gateway relay service (MD_ID="10000") that provides a virtual IP network interface relating to this sensor node (1108). When these two processing steps are complete, the gateway (110) registers the information of this sensor node as the record (410) of the sensor node ID table (363) (1109).

Next, the gateway (110) sends the gateway corresponding to the sensor node and the gateway relay service registration request (1111) to the name server (130) (1110).

GW, MD Registration Request (Argument: SN_GL_ID, GW_GL_ID, MD_ID)

Receiving the gateway and the gateway relay service registration request (1111), the name server (130) generates the gateway local ID (GW_LC_ID="22") to be allocated to the gateway (1112). After this processing step is complete, the name server (130) registers the information of these gateway and gateway relay service as the record (610) of the gateway ID table (561) and the record (710) of the sensor node management table (562), respectively (1113).

After registration is complete, the name server (130) transmits the gateway and the gateway relay service registration response (1114) to the gateway (110).

GW, MD Registration Response (Argument: GW_LC_ID)

Receiving the response, the gateway (110) stores the gateway local ID (GW_LC_ID="22") contained in the response to the gateway local ID (362) of RAM/EEPROM (360) (1115). After this storage is complete, the gateway (110) transmits the sensor node registration response (1116) to the sensor node (100).

SN Registration Response (Argument: SN_LC_ID, GW_LC_ID)

Receiving this response, the sensor node (100) stores the sensor node local ID (SN_LC_ID="01") contained in the response to the sensor node local ID (262) of the RAM/EEPROM (260) and the gateway local ID (GW_LC_ID="22") to the gateway local ID (263) of the RAM/EEPROM (260) (1117). The explanation of the processing sequence in the initial registration processing of the first sensor node is thus finished.

Figure 12:
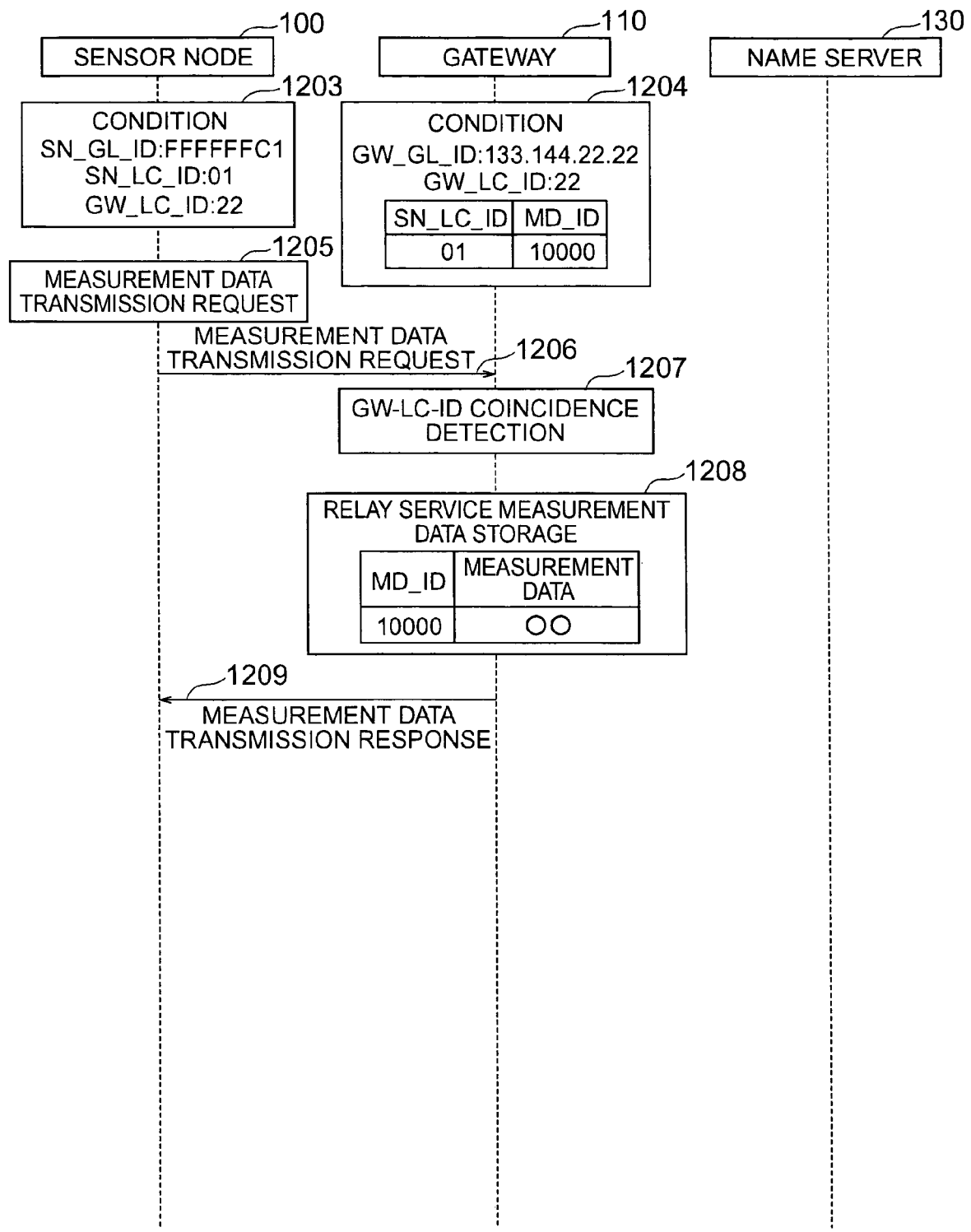
FIG. 12 is a sequence diagram of a sensor node measurement data transmission processing 1.

The second processing sequence, that is, "(2) processing sequence in measurement data transmission processing of sensor node in communication area of registered gateway", will be explained with reference to FIG. 12. First, under the state (1203) of the sensor node (100), the sensor node global ID (SN_GL_ID) has the value set at the time of production ("FFEEDDC1") in the same way as the processing sequence (1) described above. The sensor node local ID (SN_LC_ID) and the gateway local ID (GW_LC_ID) are under the same state as the registration state (1117) of the processing sequence (1). Next, as for the state (1104) of the gateway (110), the gateway global ID (GW_GL_ID) has the value ("133, 144, 22. 22") set at the time of the network connection in the same way as in the processing sequence (1) described above. The gateway local ID (GW_LC_ID) and the gateway relay service ID (MD_ID) are under the same state as the registration state (115, 1109) of the processing sequence (1) described above.

When entering the operating condition, the sensor node (100) detects that its sensor node local ID (SN_LC_ID) has already been set, and sends the following measurement data transmission request (1206) to the gateway (110) (1205).

Measurement Data Transmission Request (Argument: GW_LC_ID, SN_LC_ID, Measurement Data)

Receiving the measurement data transmission request (1206), the gateway (110) compares the gateway local ID (GW_LC_ID) contained in this request with the gateway local ID (362) in the gateway (110) and detects their coincidence (1207). Coincidence of the comparison result means that this sensor node has already been registered to the gateway of its own. Therefore, the gateway (110) retrieves the sensor node ID table (363) on its gateway by using the sensor node local ID (SN_LC_ID="01") contained in the measurement data transmission request, acquires the gateway relay service ID (MD_ID="10000") that has already been generated, and stores the measurement data in the gateway relay service (1208). After this storage is complete, the gateway (110) transmits the measurement transmission response (1209) to the sensor node (100).

Response to Measurement Data Transmission (Argument: Nil)

Receiving the response, the sensor node (100) finishes the measurement data transmission processing and suspends the operation till the measurement of the next interval. The explanation of the measurement data transmission processing sequence of the second sensor node in the communication area of the registered gateway is thus finished.

Figure 13:
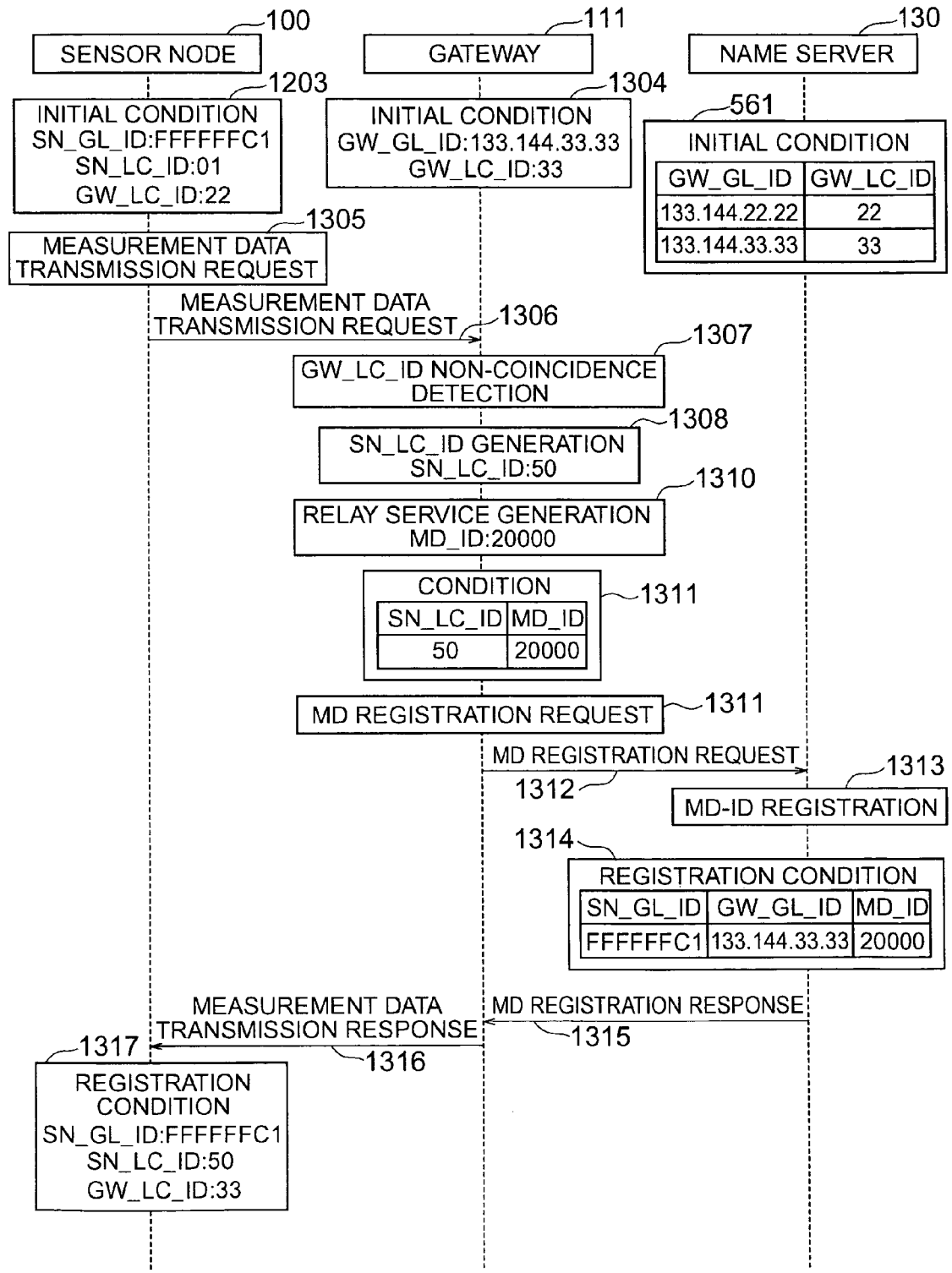
FIG. 13 is a sequence diagram of a sensor node measurement data transmission processing 2.

Next, the third processing sequence, that is, "(3) processing sequence in measurement data transmission processing of sensor node in communication area of non-registered gateway from registered gateway", will be explained with reference to FIG. 13. First, the initial state (1203) of the sensor node (100) is the same as that of FIG. 12 and the explanation will be omitted. Next, under the initial state (1304) of the gateway (111), the gateway global ID (GW_GL_ID) has the value set at the time of the connection of the gateway to the network ("133.144. 33. 33") and the gateway local ID (GW_LC_ID) has the value ("33") that is set at the time of registration of other sensor node. Finally, as for the state of the name server (1302), record registration is made with the gateway global ID (GW_GL_ID="133. 144. 22. 22" and the gateway local ID (GW_LC_ID="22"). As for the gateway (111), record registration is made with the gateway global ID (GW_GL_ID="133. 144. 33. 33") and the gateway local ID (GW_LC_ID="33") (561). As can be appreciated from the state setting described above, this sequence represents the measurement data transmission processing sequence of the sensor node when the sensor node (100) comes off from the communication area of the gateway (110) but enters the communication area of the gateway (111). When the sensor node (100) enters the operating condition, it detects that the sensor node local ID (SN_LC_ID) has already been set, and transmits the following measurement data transmission request (1306) to the gateway (111) (1305).

Measurement Data Transmission Request (Argument: GW_LC_ID, SN_LC_ID, measurement data)

Receiving the measurement data transmission request (1306), the gateway (111) compares the gateway local ID (GW_LC_ID="22" 1203)) contained in this request with the gateway local ID (GW_LC_ID="33" (1304)) in the gateway (111) and detects their non-coincidence (1307). Non-coincidence of the comparison result means that this sensor node (100) has just moved from the area of the gateway (110) to the area of the gateway (111) of its own. Therefore, the gateway (111) generates the sensor node local ID (SN_LC_ID="50") to be allocated to the sensor node (1308). Then, the gateway (111) generates a gateway relay service ID (MD_ID="20000") that provides a virtual IP network interface relating to the sensor node (1309). After these two processing steps are complete, the gateway (110) registers the information of the sensor node as the record of the sensor node ID table (1310).

Next, the gateway (111) sends the gateway relay service registration request (1312) corresponding to the sensor node to the name server (130) (1311).

MD Registration Request (Argument: SN_GL-ID, GW_LC_ID, MD_ID))

Receiving the gateway relay service registration request (1312), the name server (130) registers the information about the gateway relay service as the record (1314) of the sensor node management table (1313).

After registration is complete, the name server (130) transmits the gateway relay service registration response (1315) to the gateway (111).

MD Registration Response (Argument: Nil)

Receiving this response, the gateway (111) transmits the measurement data registration response (1316) to the sensor node (100).

Measurement Data Registration Response (Argument: SN_GL_ID, GW_LC_ID)

Receiving this response, the sensor node (100) stores the sensor node local ID (SN_GL_ID="50") contained in the response to the sensor node local ID of the RAM/EEPROM and the gateway local ID (GW_LC_ID="33") to the gateway local ID of the RAM/EEPROM (1317). The third processing sequence, that is, "(3) processing sequence in measurement data transmission processing of sensor node in communication area of non-registered gateway from registered gateway", is thus finished.

The processing flow of each constituent element will be explained since the explanation of the processing sequence in the sensor net system is finished as described above.

Figure 14:
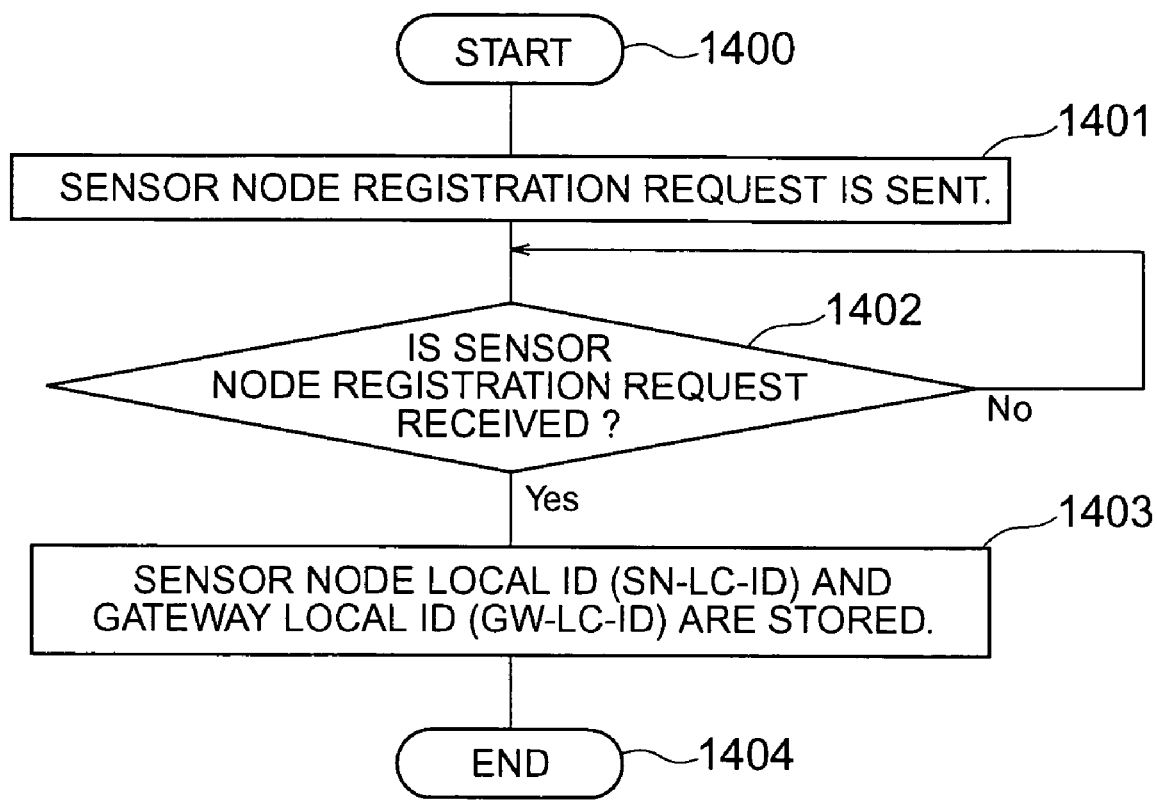
FIG. 14 is a flowchart of a sensor node registration processing.

The registration processing flow executed by the sensor node (100) in the sensor node registration processing sequence shown in FIG. 11 will be explained with reference to FIG. 14. When the sensor node (100) enters the operating condition while being under the initial state (1103), it detects that the sensor node local ID of its own (SN_GL_ID) is unset (="00"), and starts the sensor node registration processing (1400). The sensor node (100) first sends the sensor node registration request (1401). After sending the request, the sensor node waits for the reception of the sensor node registration response (1402). An error processing is omitted from the flowchart of this embodiment. If necessary, however, a re-transmission processing of the registration request may be executed by setting a timer when time is out under the registration waiting state. Receiving the registration response, the sensor node (100) stores the sensor node local ID (SN_GL_ID) contained in the response to the sensor node local ID (262) of the RAM/EEPROM (1403) and finishes the registration processing (1404). The explanation of the initial registration processing flow of the sensor node is thus finished.

Figure 15:
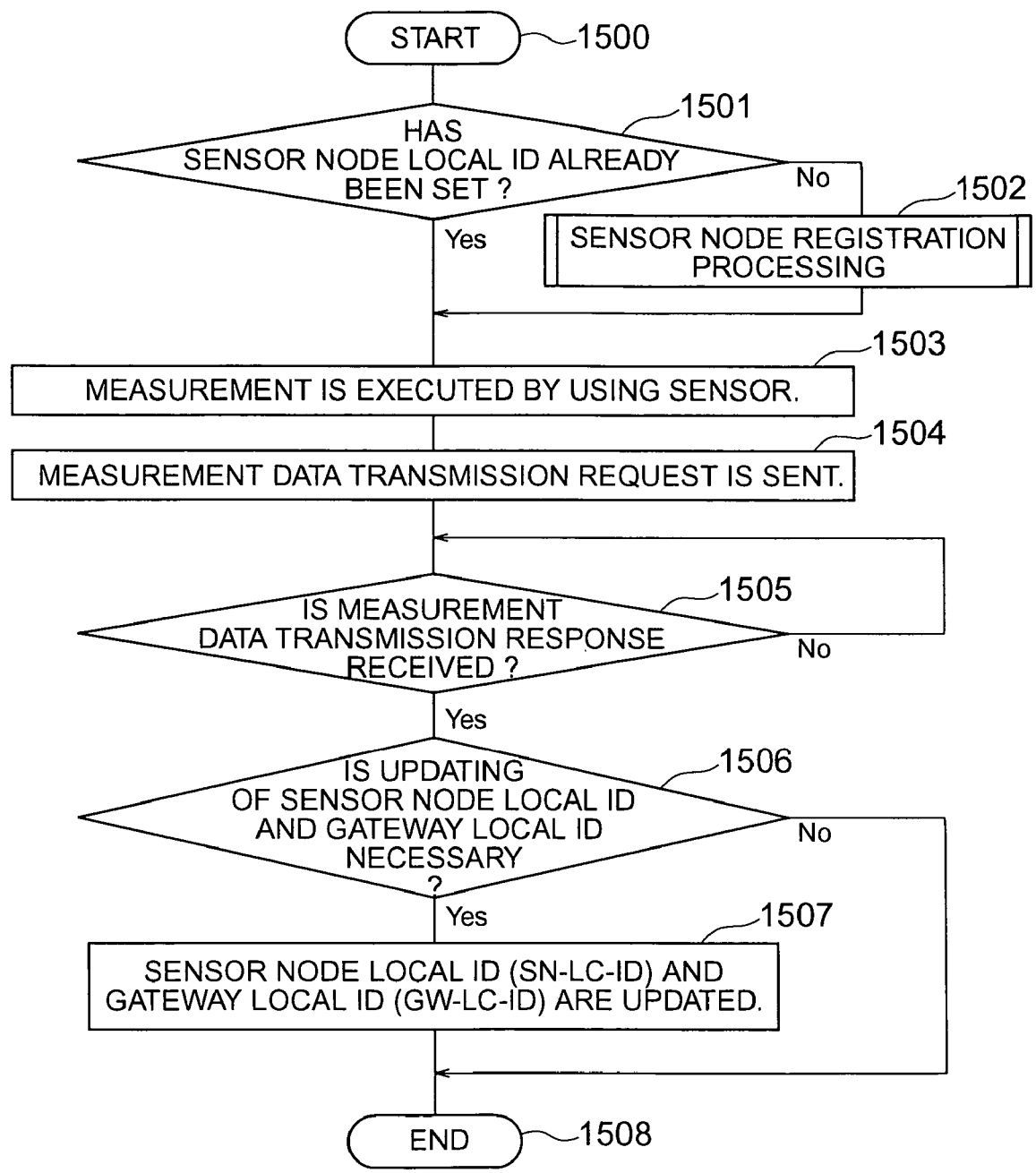
FIG. 15 is a flowchart of a sensor node measurement data transmission processing.

The transmission processing flow of the measurement data executed by the sensor node (100) in the sensor node measurement data transmission processing sequence shown in FIGS. 12 and 13 will be explained with reference to FIG. 15. Starting the operation (1500), the sensor node (100) first checks whether or not the sensor node local ID (SN_GL_ID) has already been set (1501). When it is not set, the sensor node (100) executes the sensor node registration processing shown in FIG. 14 (1502). Next, the sensor node (100) executes the measurement by using the sensor (1503) and sends the measurement data transmission request to the gateway (1504). After sending the request, the sensor node (100) waits for the reception of the measurement data transmission response (1505). The description of the error processing is omitted in the flowchart of this embodiment. If necessary, however, a processing such as a re-transmission processing of the transmission request may be executed by setting a timer when time is out under the transmission response waiting state. Receiving the transmission response, the sensor node (100) compares the sensor node local ID (SN_LC_ID) contained in this response with the sensor node local ID (262) in the stored in the RAM/EEPROM (260) of its own and checks whether or not updating is necessary (1506). Updating is necessary if the comparison result is not coincident. Therefore, the sensor node local ID (262) stored in the RAM/EEPROM (260) of its own is updated by using the sensor node local ID (SC_LC_ID) contained in the response (1507). Similarly, the sensor node (100) compares the gateway local ID (GW_LC_ID) contained in this response with the gateway local ID (GW_LC_ID) stored in the RAM/EEPROM (260) of its own and checks whether or not updating is necessary. Updating is necessary if the comparison result is not coincident. Therefore, the gateway local ID (GW_LC_ID) stored in the RAM/EEPROM (260) of its own sensor node is updated by using the gateway local ID (GW_LC_ID) contained in the response (1507). The measurement data transmission processing is thereafter finished (1508). The explanation of the measurement data transmission flow of the sensor node is thus finished.

Figure 16:
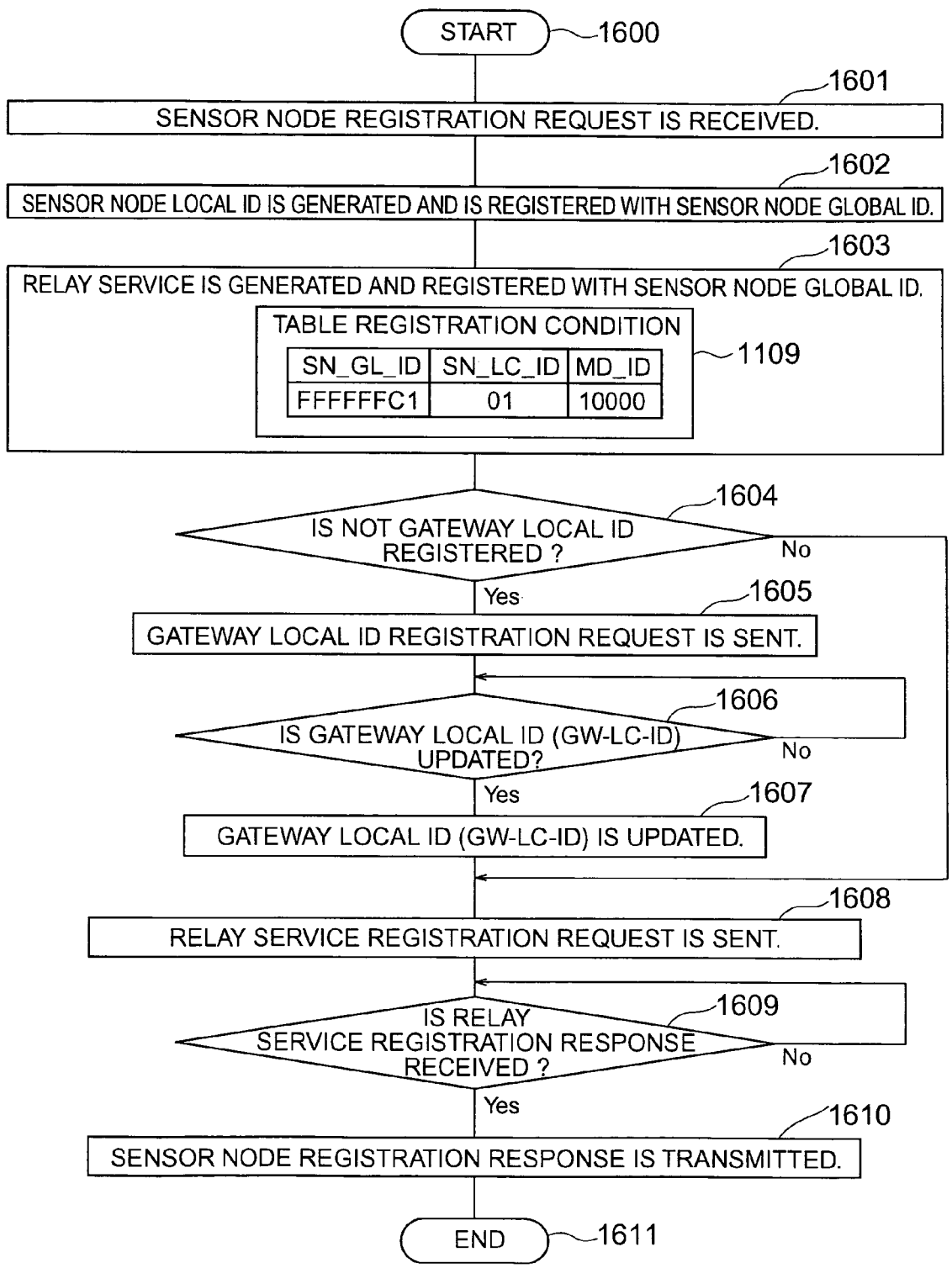
FIG. 16 is a flowchart of a gateway registration processing.

The registration processing flow of the sensor node executed by the gateway (110) in the sensor node registration sequence shown in FIG. 11 will be explained with reference to FIG. 16. Starting the operation (1600) and receiving the registration request of the sensor node (1601), the gateway (110) first generates the sensor node local ID (SN_GL_ID) and registers the resulting (SN_GL_ID) to the sensor node ID table with the sensor node global ID (1109). The gateway (110) further generates the gateway relay service (MD_ID) corresponding to the sensor node as the registration object and registers it to the sensor node ID table (1109) with the sensor node global ID. Next, the gateway (110) checks whether or not the gateway local ID has already been registered (1604) and when it has not been registered, sends the gateway local ID registration request to the name server (1605). After sending the gateway local ID registration request, the gateway (110) enters the reception state of the registration response (1606). The description of the error processing is omitted in the flowchart of this embodiment. If necessary, however, a processing such as a re-transmission processing of the transmission request may be executed by setting a timer when time is out under the transmission response waiting state. Receiving the transmission response, the sensor node (100) updates the gateway local ID (362) stored in the RAM/EEPROM (360) of its own gateway (110) by using the gateway local ID contained in the registration response (1607).

The sensor node (100) sends thereafter the registration request of the gateway relay service to the name server (1608). After sending the gateway relay service registration request, the sensor node waits for the reception of the registration response (1609). The description of the error processing is omitted in the flowchart of this embodiment. If necessary, however, a processing such as a re-transmission processing of the registration request may be executed by setting a timer when time is out under the transmission response waiting state. Receiving the registration response, the sensor node (100) generates the sensor node registration response by using the gateway local ID contained in the registration response and the sensor node local ID generated in the step 1602, transmits it to the sensor node (100) (1610) and then finishes the registration processing (1611). The explanation of the sensor node registration processing flow in the gateway is thus finished.

Figure 17:
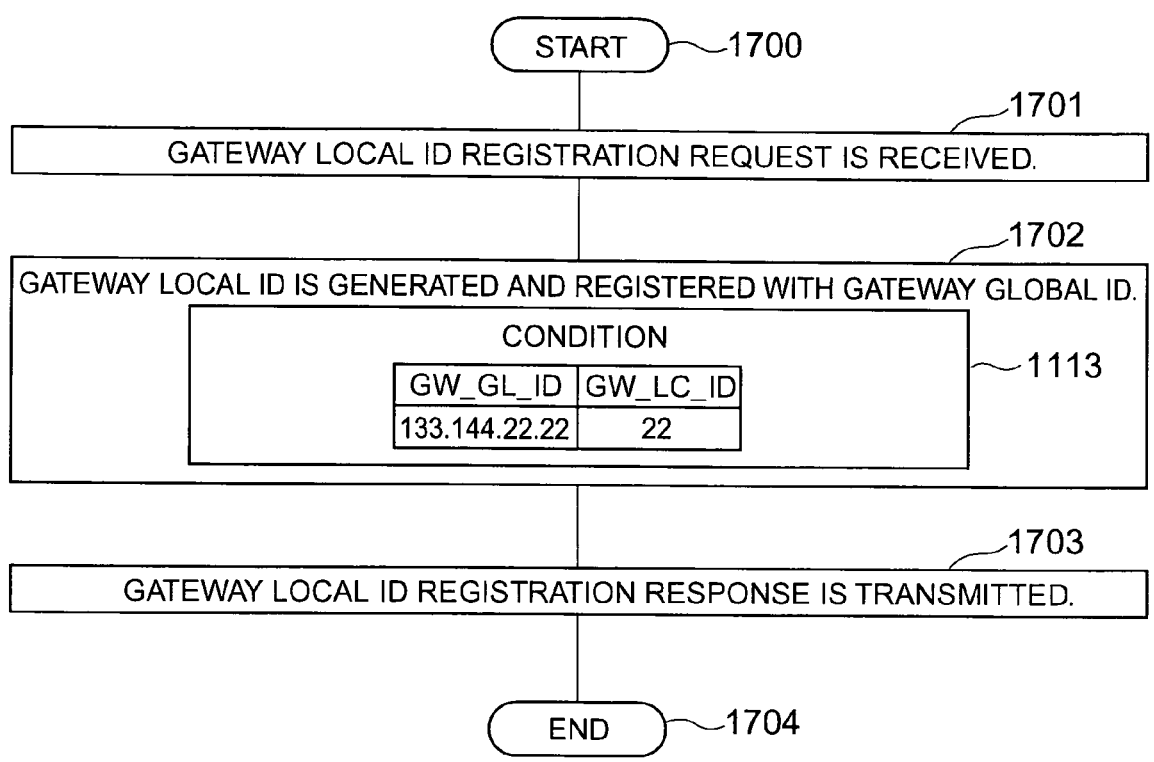
FIG. 17 is a flowchart of a name server registration processing of a gateway local ID.

The registration processing flow of the gateway local ID executed by the name server (130) in the sensor node registration sequence shown in FIG. 11 will be explained with reference to FIG. 17. Starting the operation (1700), the name server (130) receives the gateway local ID registration request of the gateway (1701). The name server (130) first generates the gateway local ID (GW_GL_ID) and registers the resulting GW_LC_ID to the gateway ID table (1113) with the gateway global ID (1702). The name server (130) further generates the gateway local ID registration response by using the gateway local ID generated in the step 1702, transmits it to the gateway (110) (1703) and finishes the registration processing (1704).

Figure 18:
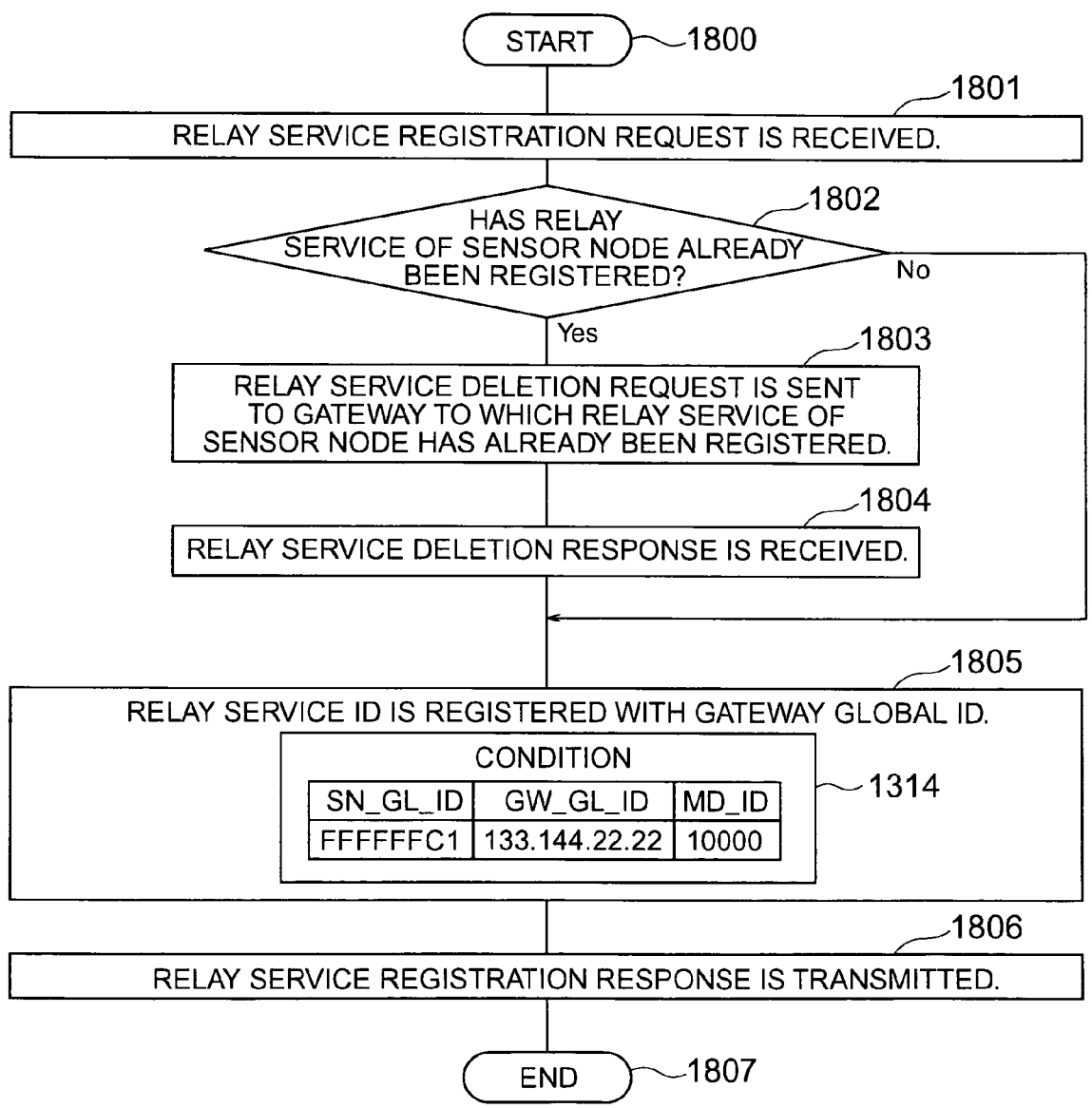
FIG. 18 is a flowchart of a name server registration processing of a gateway relay service.

The explanation of the gateway registration processing flow of the name server is thus finished. Next, the registration processing flow of the gateway relay service executed by the name server (130) in the sensor node measurement data transmission processing (2) sequence shown in FIG. 13 will be explained with reference to FIG. 18. The name server (130) starts its operation (1800) and receives the gateway relay service registration request of the gateway (1801). The name server (130) first checks whether or not the sensor node has been registered to the name server in association with the relay service of other gateways for the sensor node that is associated with the gateway relay service of the registration object (1802). When the gateway relay service of this sensor node has already been registered to other gateway, the name server (130) sends the deletion request of the registered gateway relay service to other gateways registered (1803). When the deletion request to the deletion request is received (1804), the old gateway relay service is deleted. Therefore, to cope with this registration request of the gateway relay service received in the step 1801, the name server (130) registers the gateway relay service ID with the gateway global ID contained in the registration request to the sensor node management table (1314) (1805). The name server (130) generates the gateway relay service registration response, transmits it to the gateway (110) (1806) and finishes the registration processing (1807). The explanation of the gateway relay service registration processing flow is thus finished.

Figure 19:
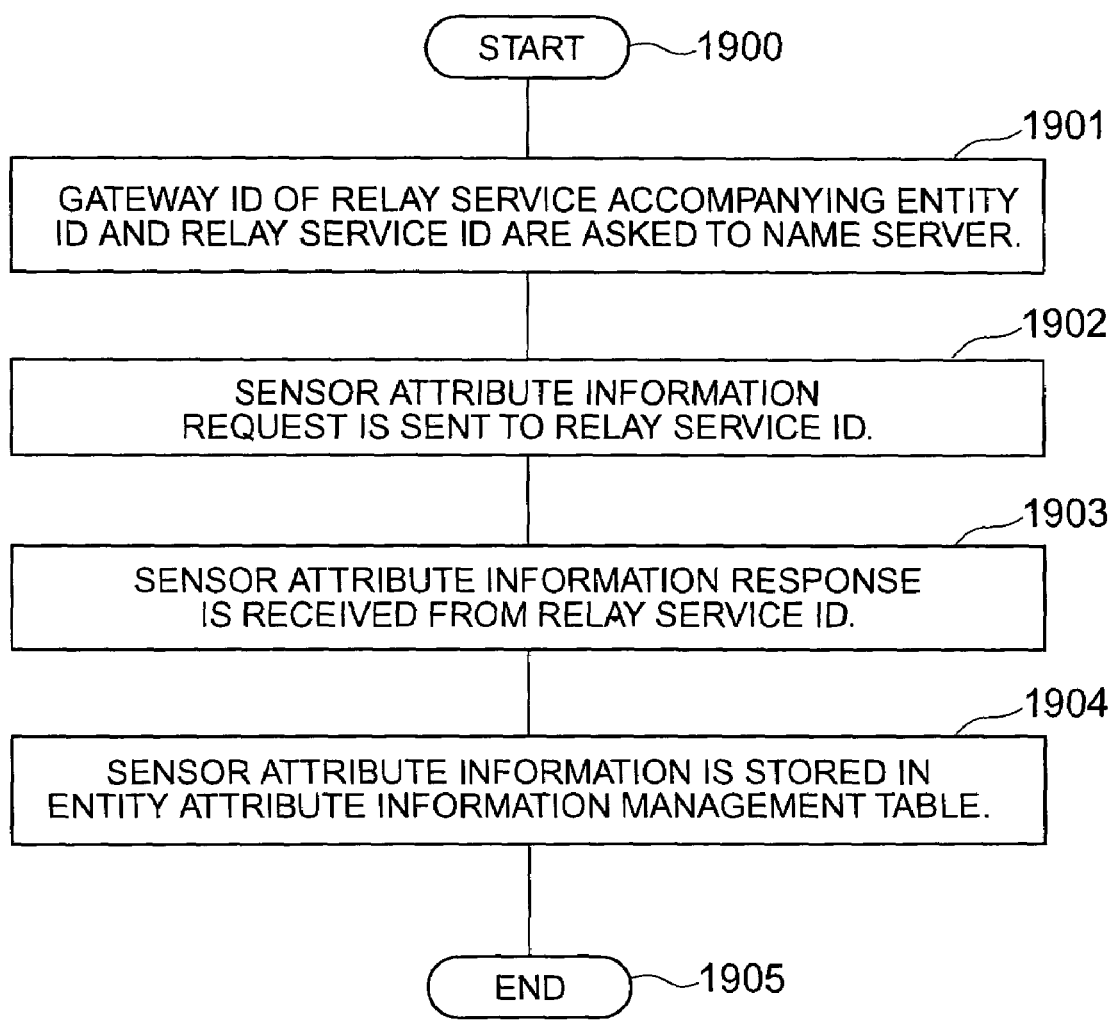
FIG. 19 is a task processing flowchart of a task server.

The task server processing flow shown in FIG. 19 will be explained. The task server (140) starts its operation (1900) and executes the task service program. An entity attribute information table (961) shown in FIG. 10 is used as the task service program, for example. As shown in the drawing, each record of the entity attribute information table (961) is constituted by a set of an entity ID (1000), basic attribute information (1001) and sensor attribute information (1002). In other words, the task server (140) manages the observation of the sensor attribute information (body temperature of 36.5° C. in the example shown in FIG. 10) of the user as the entity of the real world (staff number 2004IT10 in the example in FIG. 10) at the basic attribute information (2004, Aug., 1, 10:25:42 am in the example in FIG. 10). As described above, the task server executing the task service must ask the name server (1300) the address solution of the entity ID so that the task service program can be described by using the entity ID of the real world. More concretely, as to the gateway relay service associated with the entity ID, the task server asks the name server to retrieve the gateway ID and the relay service ID of the relay service (1901). Next, the task server sends the sensor attribute information request to the gateway relay service as the retrieval result (1902). The task server thereafter receives the sensor attribute information (1903), stores the sensor attribute information received to the entity attribute information management table (1904) and finishes the processing (1905). The explanation of the business processing flow of the task server is thus finished.

Example 2

Figure 20:
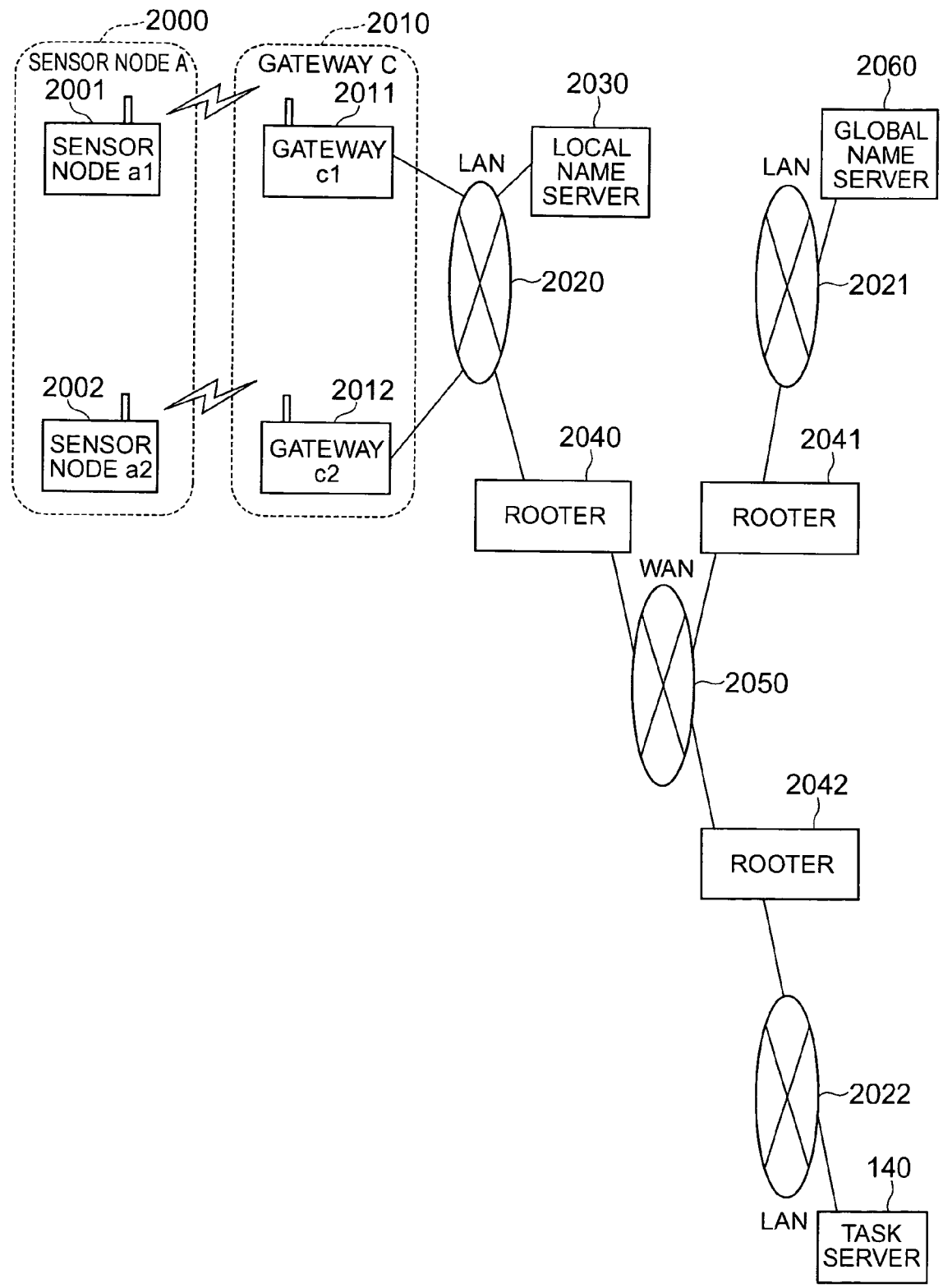
FIG. 20 is a block view of a construction 2 of a sensor network system.

FIG. 20 shows an overall construction of a sensor network system according to the second embodiment of the invention. The sensor network system includes a plurality of sensor nodes (2001, 2002), gateways (2011, 2012), a local name server (2030), a global name server (2060), a task server (140), and LANs (2020, 2021, 2022), rooters (2040, 2041, 2042) and a WAN (2050) that together connect the system components described above. In this embodiment, a sensor network operation management system having a failure-proofing function capable of executing tasks in the entire system even when any failure occurs in the sensor nodes and the gateways will be explained. In FIG. 20, dash line encompassing each sensor node represents that the sensor nodes a1 (2001) and a2 (2002) belong to one group constituting virtually one sensor node A (2000). Dash line encompassing each gateway represents that the gateways c1 (2011) and c2 (2012) belong to one group constituting virtually one gateway C (2010).

The sensor nodes a1 and Aa2 have the same function as that of the sensor node (100) shown in the embodiment 1 and their explanation will be omitted. The gateways c1 and c2, too, have the same function as that of the gateways shown in the embodiment 1 and their explanation will be omitted. The difference of this second embodiment from the first embodiment is that the second embodiment includes a global name server (2060) besides the local name server (2030) corresponding to the name server (130) in the first embodiment. The global name server (2060) executes ID management for a node virtualization function for accomplishing failure-proofing that will be later described.

Figure 21:
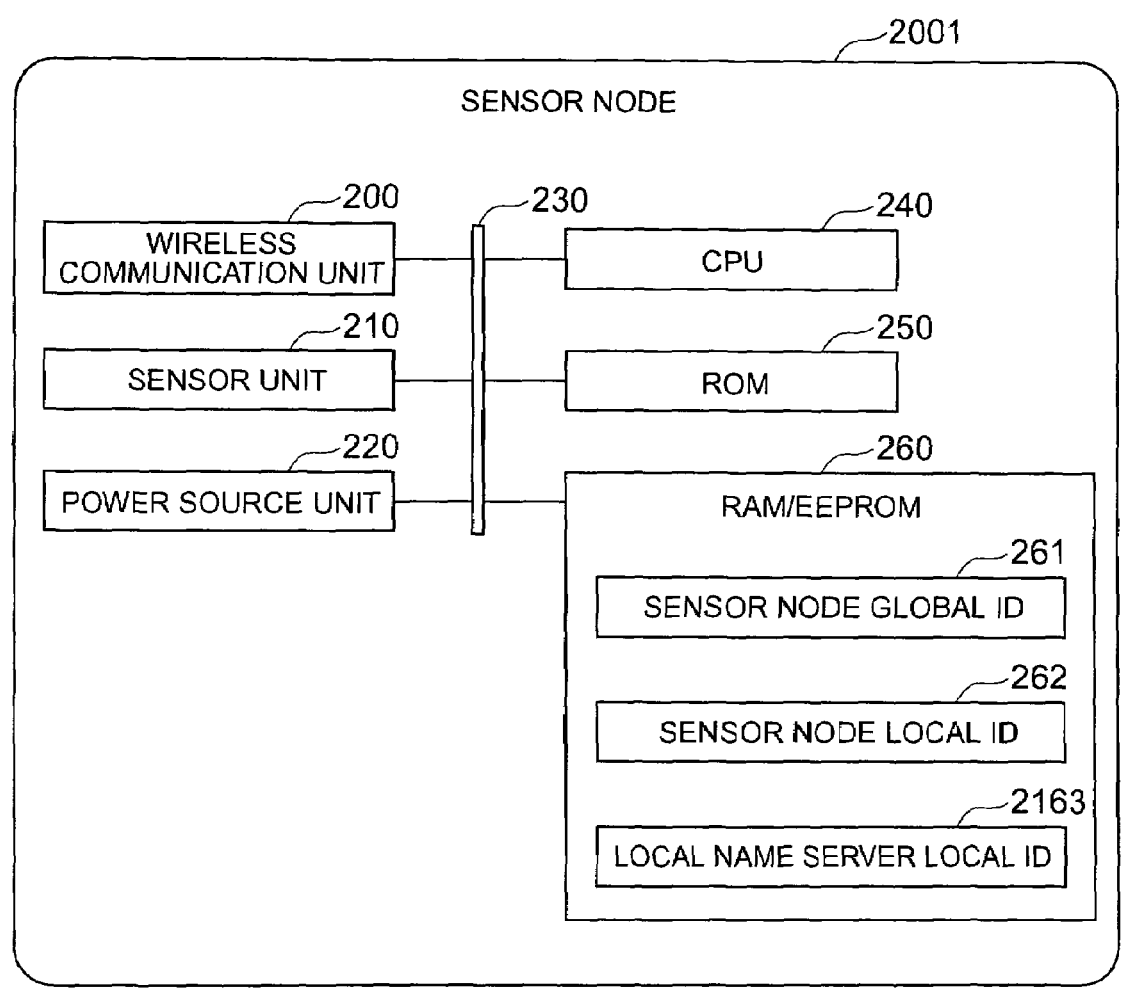
FIG. 21 is a block view of a construction 2 of a sensor node.

The construction of the sensor node (2001) shown in FIG. 21 will be explained. The sensor node (2001) has substantially the same construction as that of the sensor node (100) of the first embodiment shown in FIG. 2 and the explanation of analogous portions will be omitted. The difference of this second embodiment from the first embodiment will be explained. In the first embodiment, the gateway executes issuance of the sensor node local ID corresponding to the sensor node global ID but in the second embodiment, the local name server executes the issuance of the sensor node local ID. This is directed to use a common local ID for a plurality of gateways in order to collectively handle a plurality of gateways as one logical gateway to accomplish failure-proofing. As a result, the local name server local ID (2163) is stored in the second embodiment as shown in FIG. 21 in place of the gateway local ID (263) in the first embodiment shown in FIG. 2.

Figure 22:
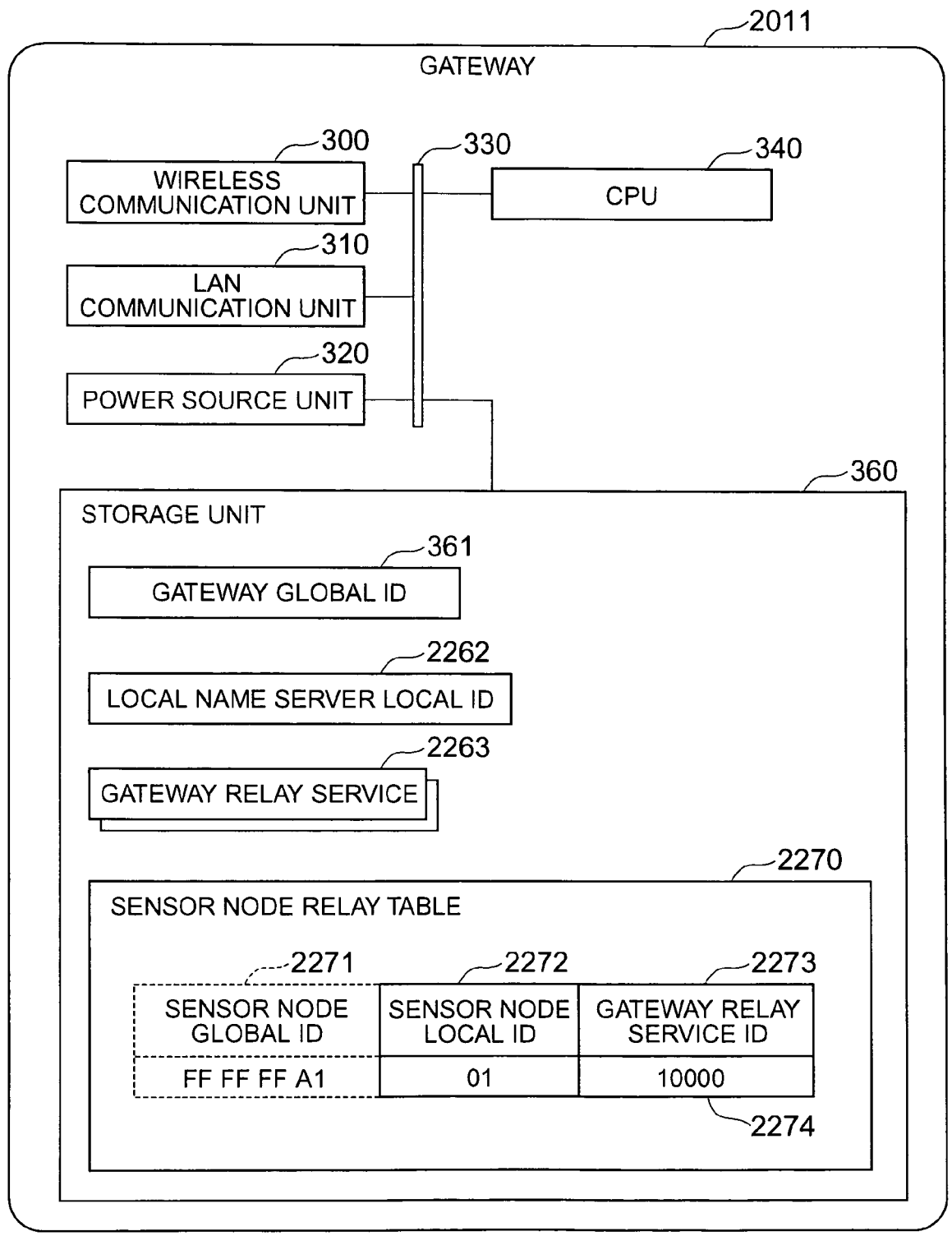
FIG. 22 is a block view of a construction 2 of a gateway.

The construction of the gateway (2011) shown in FIG. 22 will be explained. The gateway (2011) has substantially the same construction as that of the gateway (110) of the first embodiment shown in FIG. 3 and the explanation of analogous portions will be omitted. The difference of the second embodiment from the first embodiment will be explained. This embodiment employs the system in which the local name server executes the generation of the sensor node local ID to use a common local ID for a plurality of gateways in the same way as the explanation shown in FIG. 21 and for this purpose, a local name server local ID (2262) is prepared in place of the gateway local ID (362). A gateway relay service (2263) is not clearly shown in FIG. 3 but is a relay module so arranged as to correspond to the sensor node and executes relay conversion of the IP protocol and the wireless communication protocol. The sensor node relay table (2270) manages the correspondence between the gateway relay service ID and the sensor node local ID in the same way as the sensor node ID table (363) shown in FIG. 3. It manages the correspondence relation from the gateway relay service ID "10000" (2273) to the sensor node local ID "01 (2272)" in FIG. 22.

Figure 23:
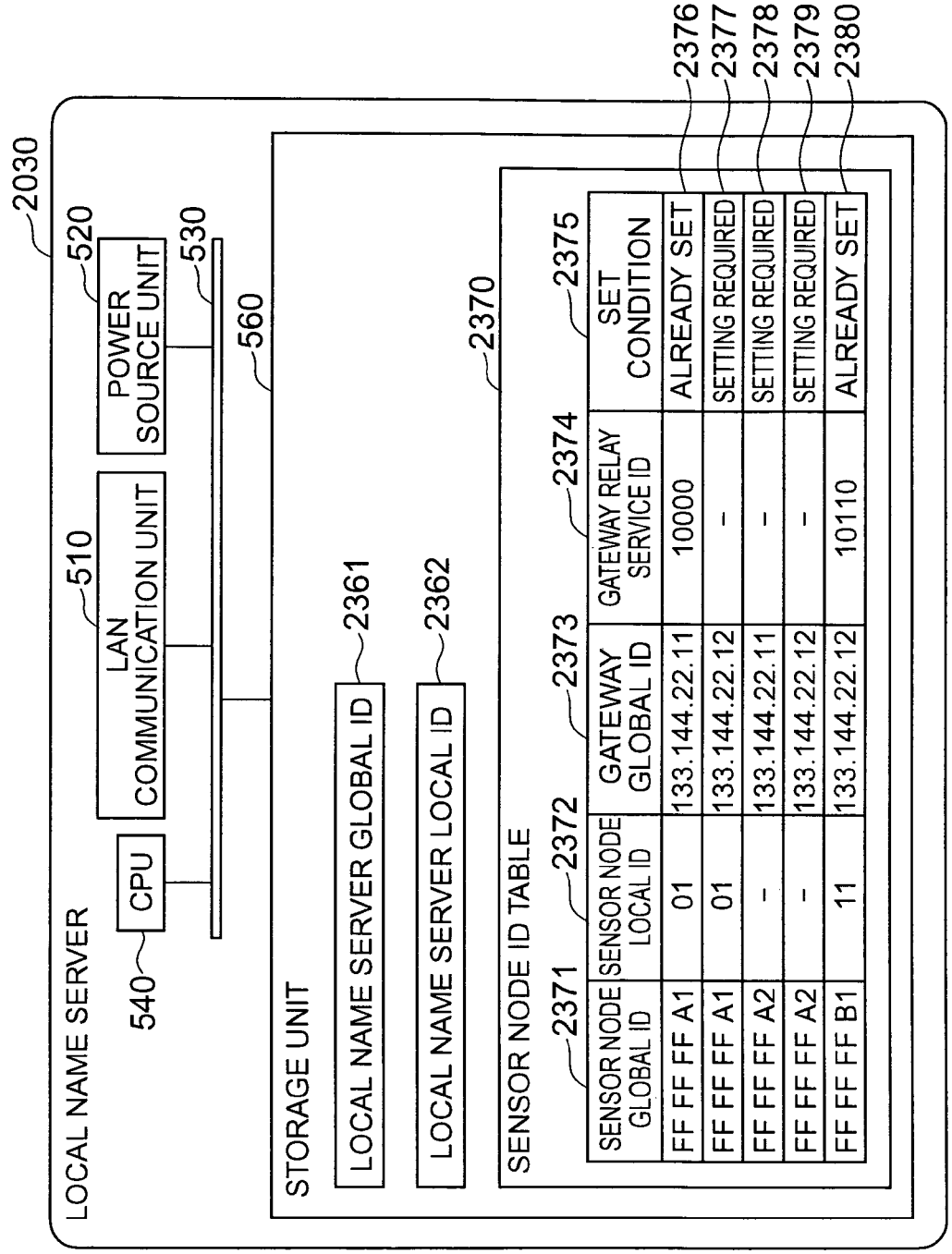
FIG. 23 is a structural block view of a local name server.

The construction of the local name server (2030) shown in FIG. 23 will be explained. The local name server (2030) has the same construction as that of the name server (130) of the first embodiment shown in FIG. 5 and the explanation of the analogous portions will be omitted. The difference of the second embodiment from the first embodiment will be explained. This embodiment employs the system in which the local name server executes the generation of the sensor node local ID to use a common local ID for a plurality of gateways in the same way as the explanation shown in FIG. 21 and for this purpose, an area corresponding to the gateway global ID (361) is prepared. Similarly, a local name server local ID (2362) is prepared as an area corresponding to the gateway local ID (362).

As for the sensor node global ID (2371), the sensor node ID table (2370) manages the correspondence relation of the sensor node, the gateway global ID (2373) corresponding to the former and the gateway relay service ID (2374). The set state represents the registration state of the gateway relay service ID corresponding to the sensor node global ID. In FIG. 23, three sensor nodes "FFFFFFA1" (2376, 2377), "FFFFFFA2" (2378, 2379) and "FFFFFFB1" (2380) are shown registered. A sensor node local ID "01" (2372) is allocated to the sensor node global ID "FFFFFFA1" (2371). A gateway relay process "10000" (2374) corresponding to the sensor node is generated for the gateway global ID "133.144.22.11" and the set state (2375) is set to "already set". However, the data access has not yet occurred between the sensor node global ID "FFFFFFA1" and the gateway global ID "133.144.11.12" and this represents that the gateway relay service ID (2374) is not generated (2377). Similarly, non-generation of the data access with the gateway is represented for the sensor node global ID "FFFFFFA2" (2378, 2379). Since the data access exists between the sensor node global ID "FFFFFFB1" and the gateway, the gateway relay service is registered (2380). The explanation will be given later about by which trigger these records (2376 to 2380) are registered.

The construction of the global name server (2060) shown in FIG. 24 will be explained. The global name server (2060) has the same construction as that of the name server (130) and the explanation of analogous portions will be omitted. The difference of the second embodiment from the first embodiment will be explained.

The local name server ID table (2410) employs the system in which the local name server executes the generation of the sensor node local ID to use a common local ID for a plurality of gateways in the same way as the explanation shown in FIG. 21 and for this purpose, the local name server local ID (2410) is prepared as a table corresponding to the gateway ID table (361) shown in FIG. 6.

A sensor node location management table (2430) represents from which gateway belonging to the local name server (2422) the sensor node (2421) can be accessed. As shown in the drawing, the sensor node global ID "FFFFFFA1" is connected to the gateway belonging to the local name server global ID "133.144.22.22" (meaning the local name server C (2030) shown in FIG. 20).

A sensor node construction management table (2430), a gateway construction management table (2440) and gateway correspondence relation definition information (2450) are management information unique to this embodiment and are essential constituents for accomplishing failure-proofing. First, the sensor node construction management table (2430) represents the correspondence relation between the logical sensor node A shown in FIG. 20 (virtual sensor node (2000) encompassed by dash line) and an actual sensor node constituting the former (sensor node a1 (2001) and sensor node a2 (2002)). More concretely, the record (2433) represents the logical sensor node encompassed by the dash line by the sensor node main ID (2431) and its value is sensor node global ID="FFFFFFA0". Next, the relation Item_Total="2" represents that this logical sensor node is constituted by two actual sensor nodes. Furthermore, its first sensor node (Item_Num="1") is the sensor node of the sensor node global ID="FFFFFFA1" represented by a sensor node sub ID (2432).

Similarly, the record (2434) represents that the second sensor node constituting the sensor node A is a sensor node having a sensor node global ID="FFFFFFA2". As described above, the sensor node construction management table shown in FIG. 24 can represent the group construction of the sensor nodes shown in FIG. 20.

Next, the gateway construction management table (2440) will be explained. The gateway construction management table (2440) represents the correspondence relation among the logical gateway C shown in FIG. 20 (virtual gateway (2010) encompassed by dash line), an actual gateway constituting the former (gateway c1 (2011) and the gateway c2 (2012)) in the same way as the sensor node construction management table described above. More concretely, the record (2443) represents the logical gateway encompassed by the dash line by the gateway main ID (2441) and its value is a gateway global ID="133.144.22.10". Next, the relation Item-Total="2" represents that this logical gateway is constituted by two actual gateways. Furthermore, its first gateway (Item_Num="1") is the gateway of the sensor node global ID="133.144.22.11" represented by a gateway sub ID (2442).

Similarly, the record (2444) represents that the second gateway constituting the gateway C is a gateway having a gateway global ID="133.144.22.12". As described above, the gateway construction management table shown in FIG. 24 can represent the group construction of the gateways shown in FIG. 20.

Finally, the entity management table (563) has the same construction as the construction of the first embodiment shown in FIG. 8 and its explanation is therefore omitted.

An example of the sensor node and gateway correspondence relation definition information shown in FIG. 25 will be explained.

FIG. 25 shows an example of the definition information of the three correspondence relations about the sensor node A and the gateway C shown in FIG. 20. Here, the logical sensor node A is physically constituted by two sensor nodes a1 and a2 and the logical gateway C is physically constituted by two gateways c1 and c2. Which definition information is to be used depends on the task condition.

The first definition information will be explained by using (1) and (2) in FIG. 25. Item (1) represents the example of the definition information where four data are collected for all the combinations of two physical sensor nodes and two physical gateways when collecting the measurement data of the sensor node A, all the data are subjected to the AND processing and the gateway C of the logical sensor node A is judged as the collected data from the result of the AND processing. The first row of the definition information represents that the logical sensor node SN Main corresponds to the sensor node global ID "FFFFFFA0". The second row of the definition information represents that the logical gateway GW_Main corresponds to the gateway global ID "133.144.22.10". The third row of the definition information represents that the logical sensor node SN_Main is constituted by two physical sensor nodes SN_Sub1 and SN_Sub2. The fourth row of the definition information represents that the logical gateway GW_Main is constituted by two physical gateways GW_Sub1 and GW_Sub2. The fifth to eighth rows describe how the access correspondence relation between the logical sensor node and the gateway is expanded to the access correspondence relation between the physical sensor node and the gateway. More concretely, the expansion is defined in such a fashion that four sets of data are collected for all the combinations of the two sensor nodes and the two gateways and all the data are AND processed to the final result. This definition is useful when it is desired to strictly measure an object phenomenon.

Next, the concrete expansion result will be explained with reference to (2). Item (2) represents the expansion result when the sensor node and gateway correspondence relation definition information defined in (1) is expanded by using the sensor node construction management table (2430) and the gateway construction management table (2440). The sensor node ID table (2370) of the local name server (2030) is set by using this expansion information as will be later described.

Similarly, (3) and (4) in FIG. 25 as the second definition information will be explained. Item (3) represents an example of the definition information when the data that is first collected is judged as the data collected by using the gateway C of the logical sensor node A among all the combinations of two physical sensor nodes and two gateways to collect the measurement data of the sensor node A by using the gateway C. This definition is useful when it is desired to measure the object phenomenon by taking a possible failure into consideration.

Turning to FIG. 26, (5) and (6) in FIG. 25 as the third definition information will be likewise explained. Item (5) represents an example of the definition information when two sets of data are collected for exclusive combinations of two sensor nodes and two gateways and the AND processing result of the two data collected is judged as the data collected by using the gateway C of the logical sensor node A. This definition is general definition when the sensor node and the gateway have a double system.

A definition for judging which of the sensor nodes and the gateways is in fault can be described by inspecting the degree of coincidence of the four kinds of the measurement information of (1) though it is not shown in FIG. 25.

The registration processing sequence diagram shown in FIG. 27 will be explained. First, the gateway c1 (2011) detects the sensor node a1 (2001) (2601). Next, the gateway c1 (2011) sends the registration request of the sensor node a1 to the local name server (2030) (2602).

SN Registration Request (Argument: SN_GL_ID, GW_GL_ID)

Receiving the registration request, the local name server (2030) transmits a sensor node/gateway construction analysis request (2603) to the global name server (2060) to enquire whether or not the sensor node a1 (2001) is registered to the sensor node and gateway correspondence relation definition information (2450) on the global name server (2060) and what is the registration content when it is registered.

SNGW Construction Analysis Request (Argument: SN_GL_ID, GW_GL_ID)

Receiving the construction analysis request, the global name server (2060) executes a sensor node and gateway construction analysis processing (2604). More concretely, the global name server (2060) first retrieves a sensor node construction management table (2430) by using SN_GL_ID="FFFFFFA1" received. As a result of this retrieval, the information that the sensor node a1 is a sub sensor node of the sensor node A (SN_GL_ID="FFFFFFA0") is acquired. Furthermore, the result that the sensor node A (SN_GL_ID="FFFFFFA0") is constituted by the sensor node a1 (SN_GL_ID="FFFFFFA1") and the sensor node a2 (SN_GL_ID="FFFFFFA2") is acquired. Next, the global name server (2060) retrieves the gateway construction management table (2440) by using GW_GL_ID="133.144.22.11" received. As a result of this retrieval, the information that the sensor node c1 is a sub gateway of the gateway C (GW_GL_ID="133.144.22.10") is acquired. Furthermore, the result that the gateway C (GW_GL_ID="133.144.22.10") is constituted by the gateway c1 (GW_GL_ID="133.144.22.11") and the gateway c2 (GW_GL_ID="133.144.22.12") is acquired.

Next, the global name server (2060) retrieves the sensor node and gateway correspondence relation definition information (2450) by using the retrieval result described above and acquires the sensor node and gateway relation definition information containing the sensor node A (SN_GL_ID="FFFFFFA0") and the gateway C (GW_GL_ID="133.144.22.10"). The following explanation will be given on the assumption that the relation definition information as the retrieval result is FIG. 25(1). SN_Main="FF FF FF A0" as the first row of (1) is actually coincident with the sensor node A (SN_GL_ID="FFFFFFA0"). Furthermore, GW_Main="133.144.22.10" as the second row of (1) is actually coincident with the gateway C (GW_GL_ID="133.144.22.10"). Coincidence of the sensor node main ID and the gateway main ID represents that selection of (1) as the relation definition information coincident with the SNGW construction analysis request is reasonable. Next, the correspondence of the following sub sensor node ID and sub gateway ID can be derived by collating the third and fourth rows of (1), the retrieval result of the sensor node construction management table and the retrieval result of the gateway construction management table.

SN_Sub1="FFFFFFA1"
SN_Sub2="FFFFFFA2"
GW_Sub1="133.144.22.11"
GW_Sub2="133.144.22.12"

The expansion result of FIG. 25(2) can be obtained when the sensor node and gateway relation definition information of the fifth to eighth rows of (1) is expanded by using this correspondence information.

Figure 27:
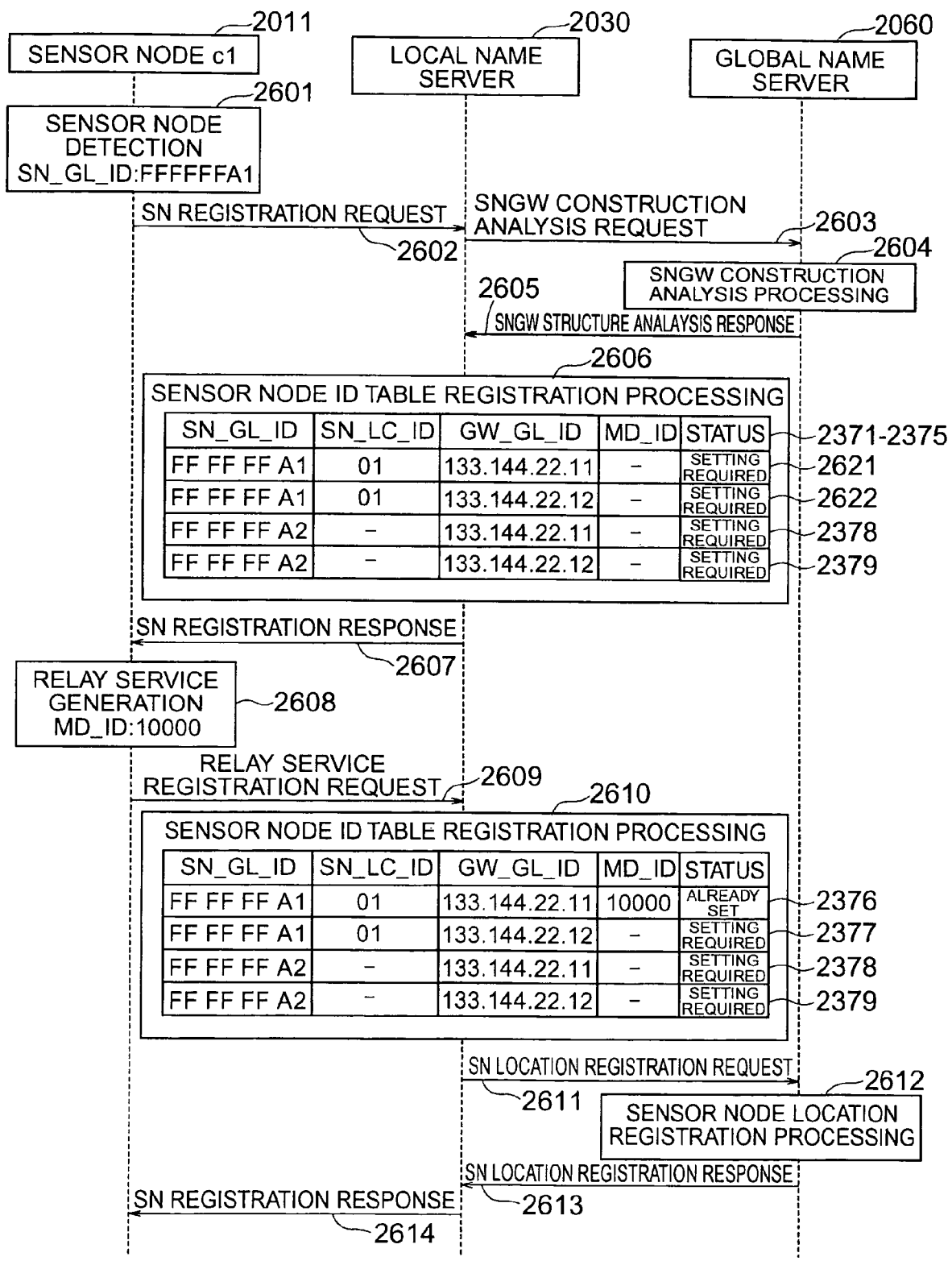
FIG. 27 is a sequence view of a sensor node registration processing.

Turning back again to the explanation of FIG. 27, the global name server (2060) after the sensor node gateway construction analysis processing (2604) transmits the sensor node gateway construction analysis response (2605).

SNGW Construction Analysis Request (Argument: Expansion Result of Construction Analysis Definition Information Shown in FIG. 25(2))

Receiving the response, the local name server (2030) registers the expansion result to the sensor node ID table (2370) (records 2621, 2622, 2378, 2379). To store the sensor node a1, the local name server generates the sensor node local ID="01" and stores it in the records 2621 and 2622 (step 2606). Next, the local name server (2030) sends the sensor node registration response to the gateway c1 (2011) (step 2607).

SN Registration Response (Argument: Registration Success)

Receiving the response, the gateway c1 (2011) generates a relay service for the sensor node a1 (step 2608). After generating the relay service, the gateway c1 (2011) transmits the registration request of the relay service so generated to the local name server (2030).

Relay Service Registration Request (Argument: MD_ID)

Receiving the response, the local name server (2030) registers the relay service MD_ID="10000" to the sensor node ID table (2370) (record 2376, 2377) (step 2610).

SN Location Registration Request (Argument: SN_GL_ID, Local Name Server Global ID)

Receiving the request, the global name server (2060) executes a sensor node location registration processing (step 2612 for the sensor node location management table by using the information about the sensor node a1 as the record 2423 (step 2610). After the registration processing is complete, the global name server (2060) transmits the SN location registration response to the local name server (2030) (step 2613).

SN Location Registration Response (Argument: Registration Success)

Receiving the response, the local name server (2030) transmits the sensor node registration response to the gateway c1 (2611).

SN Registration Response (Argument: Registration Success)

The explanation of the sequence diagram of the sensor node registration processing shown in FIG. 27 is thus finished. Next, the gateway and the processing flow of the server for accomplishing the sensor node registration processing described above will be explained.

Figure 28:
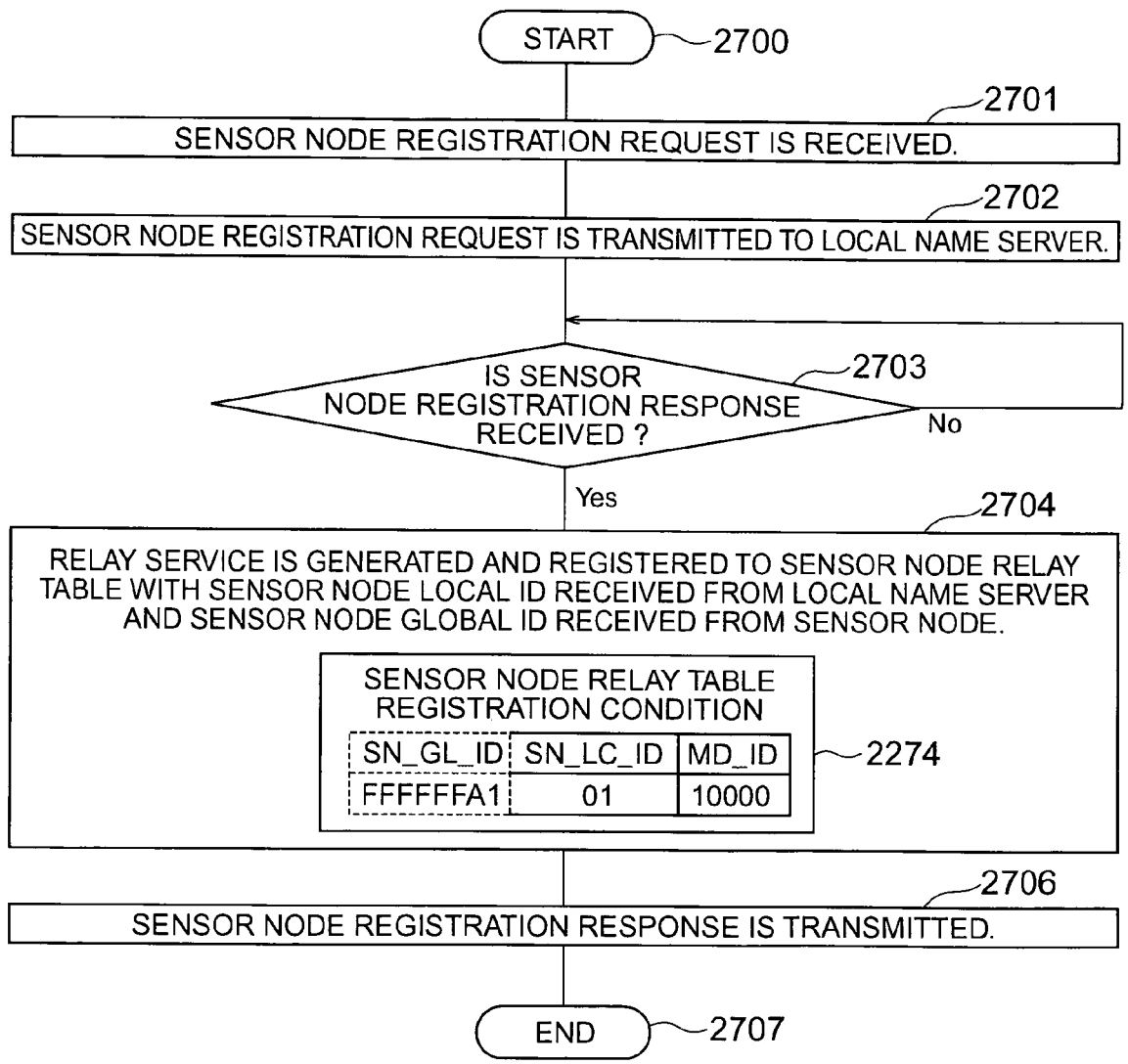
FIG. 28 is a flowchart of a gateway registration processing.

The sensor node processing flow of the gateway will be first explained with reference to FIG. 28. The gateway starts the registration processing (step 2700). The gateway receives the registration request from the sensor node (step 2701) and transmits the sensor node registration request to the local name server (step 2702). The gateway thereafter waits for the reception of the sensor node registration response (step 2703). After receiving the sensor node registration response, the gateway generates the relay service and registers the ID of the relay service so generated to the sensor node relay table (2274) with the sensor node local ID received from the local name server and the sensor node global ID received from the sensor node (step 2704). Finally, the gateway transmits the sensor node registration response to the sensor node (step 2706) and finishes processing.

Figure 29:
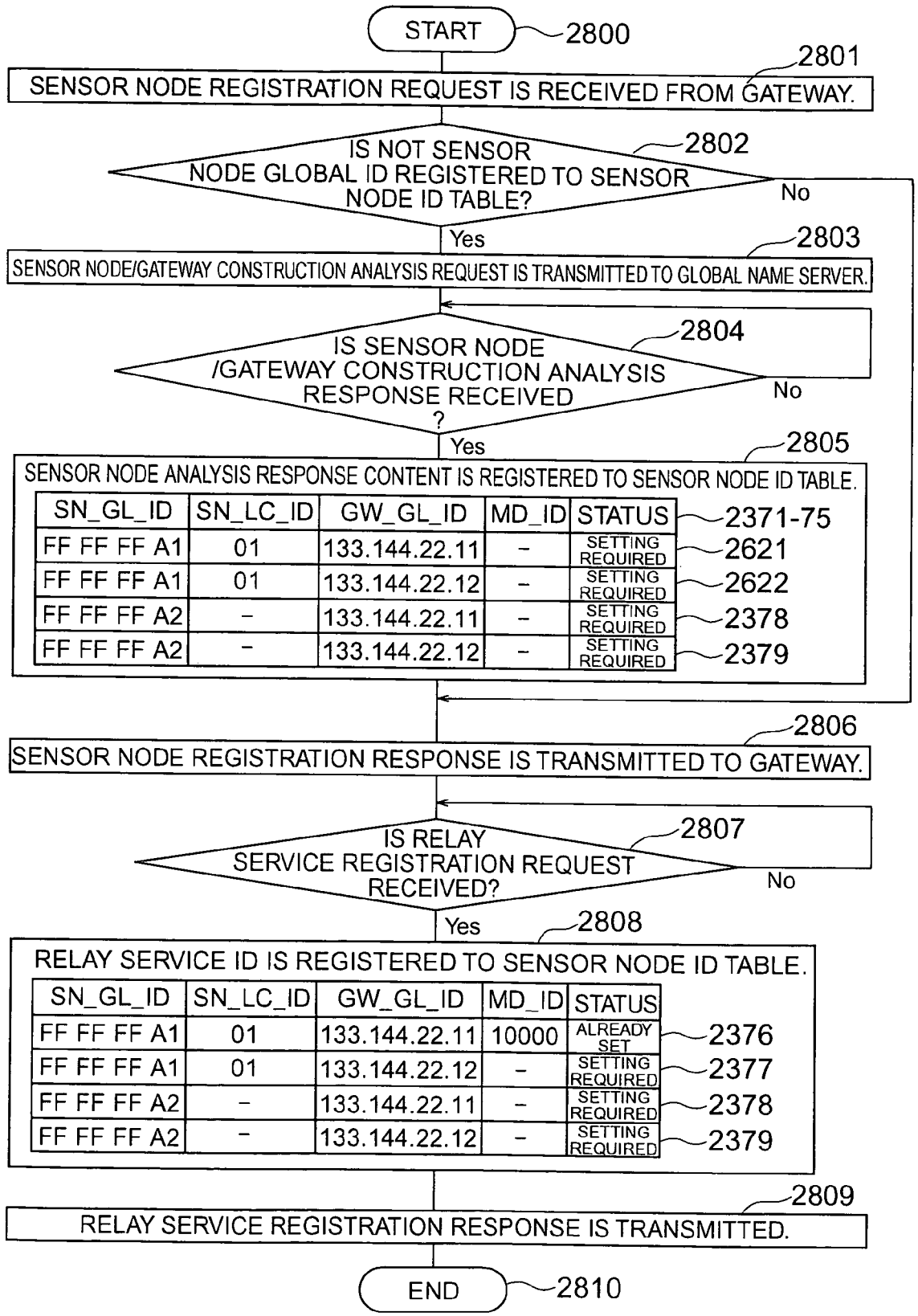
FIG. 29 is a flowchart of a local name server registration processing.

Next, the sensor node registration processing flow of the local name server will be explained with reference to FIG. 29. The local name server starts the processing (step 2800). The local name server receives the sensor node registration request from the gateway (step 2801). The local name server confirms that the sensor node global ID of the registration request is not registered to the sensor node ID table (step 2802). If it is registered, the local name server jumps the flow to step 2806 and transmits the sensor node registration response to the gateway. The local name server transmits the sensor node/gateway construction analysis request to the global name server (step 2803) when the sensor node global ID is not yet registered. The local name server thereafter waits for the reception of the sensor node/gateway construction analysis response (step 2804). After receiving the sensor node/gateway construction analysis response, the local name server registers the sensor node analysis content to the sensor node ID table (2805). Since the content of the sensor node ID table in step 2850 shown in the drawing is the same as that of step 2606 in FIG. 26, the explanation will be omitted. After the data registration, the sensor node registration response is transmitted to the gateway (step 2806) and the relay service registration request from the gateway is awaited (step 2807). When the relay service registration request from the gateway is received, the relay service ID in the reception data is registered to the sensor node ID table (step 2808). Since the content of the sensor node ID table in step 2808 shown in the drawing is the same as that of step 260 in FIG. 27, the explanation will be omitted. After the data registration, the relay service registration response is transmitted to the gateway (step 2809) and the processing is finished (step 2810).

Figure 30:
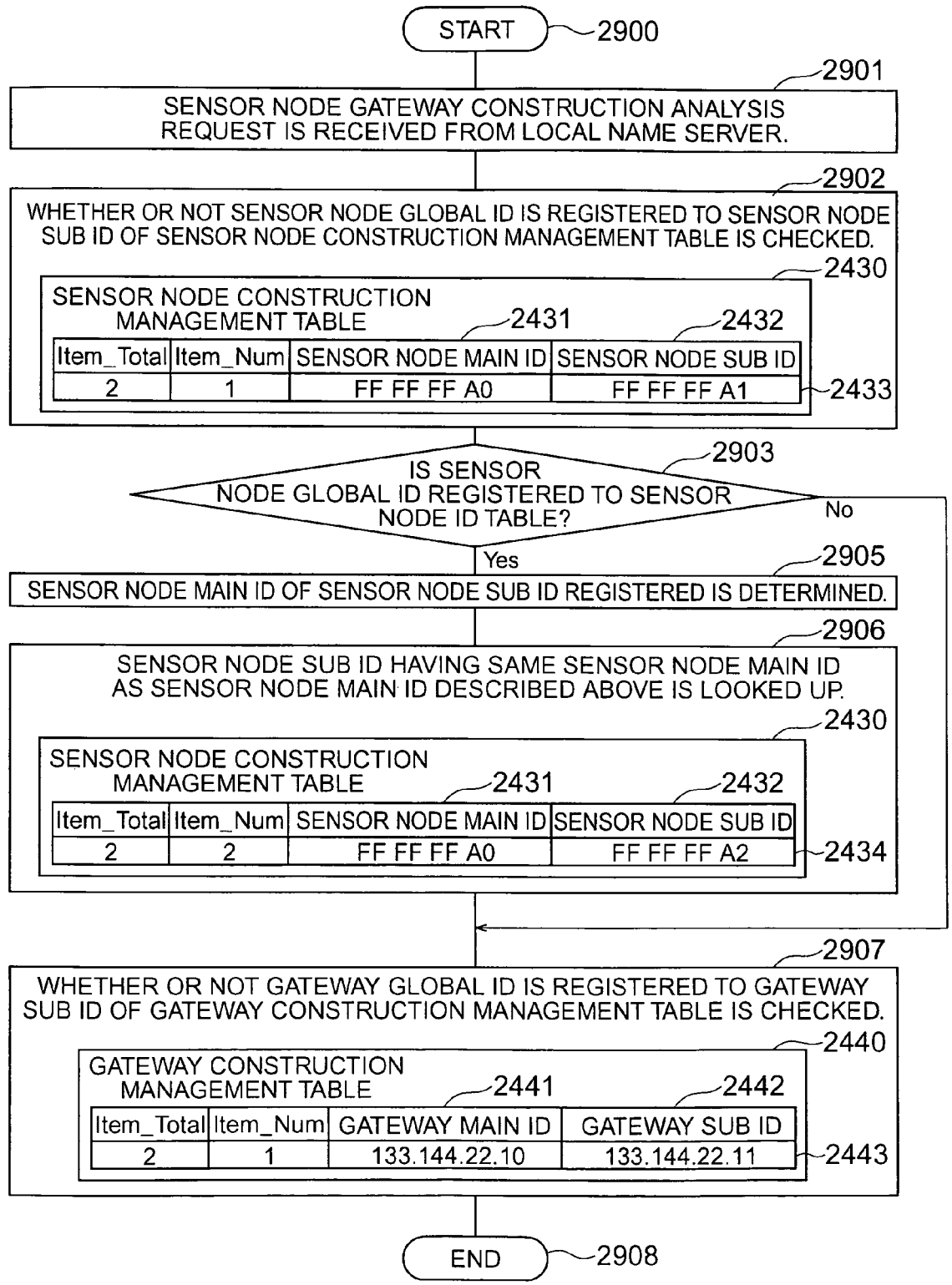
FIG. 30 is a flowchart of a global name server registration.

Next, the sensor node registration processing flow of the global name server will be explained with reference to FIG. 30. The global name server starts the processing (step 2900). The global name server receives the sensor node/gateway construction analysis request from the local server (step 2901). The global name server checks whether or not the sensor node global ID of the registration request is registered to the sensor node sub ID (step 2902). Since the content of the sensor node construction management table (2430) in step 2902 shown in the drawing is the same as that of the record 2433 in FIG. 24, its explanation will be omitted. Next, whether or not the sensor node global ID is registered to the sensor node ID table is checked (step 2903). If it is not registered, the sensor node has a single construction and the report to the effect that the sensor node has the single construction is transmitted as the sensor node/gateway construction analysis response in the later-appearing step 2914. If it is registered, the sensor node main ID of the registered sensor node sub ID is determined (step 2905). Next, the sensor node sub ID having the same sensor node main ID as the sensor node main ID is retrieved (step 2906). Since the content of the sensor node construction management table (2430) in step 2906 shown in the drawing is the same as that of step 2434 in FIG. 24, the explanation will be omitted. The global name server checks whether or not the gateway global ID of the registration request is registered to the gateway sub ID of the gateway construction management table (step 2907). Since the content of the gateway construction management table (2440) in step 29067 shown in the drawing is the same as that of the record 2443 in FIG. 24, the explanation will be omitted.

Figure 31:
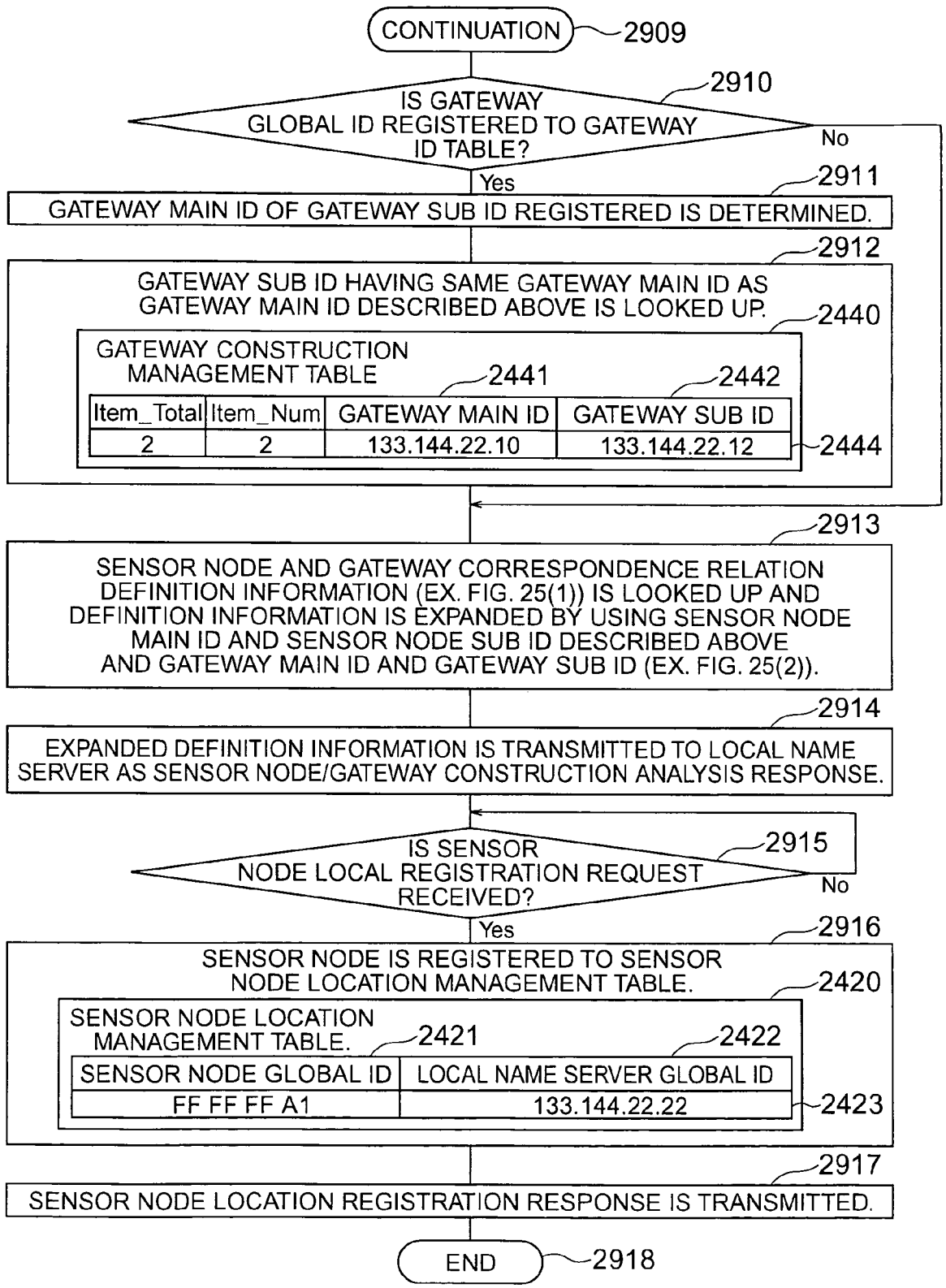
FIG. 31 is a flowchart of a global name server registration (continuation)

The explanation will be continued with reference to FIG. 31. Next, whether or not the gateway global ID is registered to the gateway ID table is checked (step 2910). If it is not registered, the gateway has a single construction and the report to the effect that the gateway has the single construction is transmitted as the sensor node/gateway construction analysis response in the later-appearing step 2914. If it is registered, the gateway main ID of the registered gateway ID is determined (step 2911). Next, the gateway sub ID having the same gateway main ID as the gateway main ID is retrieved (step 2912). Since the content of the gateway construction management table (2440) in step 2912 shown in the drawing is the same as that of the record 2444 in FIG. 24, the explanation will be omitted. Next, the global name server refers to the sensor node and gateway corresponding relation definition information (example of definition information: FIG. 25(1)) and expands the sensor node and gateway correspondence relation definition information by using the sensor node main ID, the sensor node sub ID, the gateway main ID and the gateway sub ID obtained by retrieval (step 2913). The definition information so expanded is transmitted as the sensor node/gateway construction analysis response to the local name server (step 2914). After this transmission, the reception of the sensor node location registration information from the local name server is awaited (step 2915). When the sensor node location registration request is received, the sensor node is registered to the sensor node location management table (step 2916). Since the content of the sensor node location management table (2420) shown in the drawing is the same as that of the record 2443 in FIG. 24, the explanation will be omitted. Finally, the global name server transmits the sensor node location registration response to the local name server (step 2917) and finishes the processing (step 2918).

The explanation of the processing flows of the gateway and server for accomplishing the sensor node registration processing shown in FIGS. 27 to 31 is thus finished. Finally, the explanation will be given on the sequence diagram of the gateway and the server when the task server executes the task through the sensor node and the gateway registered as descried above.

First, the system condition as the premise of this processing will be explained. The sensor node/gateway correspondence relation definition information (2450) of the global name server (2060) stores the expansion result (FIG. 25(2)) of the sensor node/gateway correspondence relation definition information that is generated by executing the sensor node/gateway construction analysis request described above. In the local name server (2030), information registration is made to the sensor node ID table as a result of the reception of the sensor node/gateway construction analysis request (3001).

In FIG. 32, the record 3001 is generated from the expansion result "(FFFFFFA1, 133.144.22.11)" shown in FIG. 25(2) and is stored. The record 3002 is generated from the expansion result "(FFFFFFA1, 133.144.22.12)" shown in FIG. 25(2) and is stored. The record 3003 is generated from the expansion result "(FFFFFFA2, 133.144.22.11)" shown in FIG. 25(2) and is stored. The record 3001 is generated from the expansion result "(FFFFFFA2, 133.144.22.12)" shown in FIG. 25(2) and is stored.

The actual flow of the processing will be explained. First, the global name server (2060) receives the sensor node measurement data request from the task server (step 3005). It will be assumed hereby that the sensor node as the object of the sensor node measurement data request is the sensor node A and that the sensor node global ID "FFFFFFA0" is designated as the parameter to this request. The global name server looks up the expansion result of the sensor node and gateway correspondence relation definition information stored in the sensor node and gateway correspondence relation definition information (2450) by using the sensor node global ID (step 3006). The sensor node is stored as the expansion result of the definition information (FIG. 25(2)) as described above. It can be appreciated according to this information that the sensor node A "FFFFFFA0" as the requesting party of the measurement data is logically one sensor node but is actually the result of the AND processing of four sensor node measurement data acquired through the four paths as the combination of two sensor nodes a1 "FFFFFFA0" and a2 "FFFFFFA0" and two gateways c1 "133.144.22.11" and c2 "133.144.22.12". Next, the global name server (2060) acquires the four sensor data described above.

The first acquisition processing of the sensor node measurement data represented by the expansion result "(FFFFFFA1, 133.144.22.11)" in FIG. 25(2) will be explained (3007 encompassed by dash line in FIG. 32). The global name server sends the sensor node measurement data request (3008) to the local name server.

SN Measurement Data Request (Argument: "FFFFFFA1", "133.144.22.11")

After receiving the request, the local name server looks up the sensor node ID table (3000) inside the server of its own and acquires as the retrieval result the record (3001) coincident with the parameter "(FFFFFFA1, 133.144.22.11)" of the request. Next, the local name server sends the sensor node measurement data request (3009) to the gateway by using the gateway relay service ID (MD_ID="10000") as 1 column of the retrieval result record.

SN Measurement Data Request (Argument: "133.144.22.11", "10000")

After receiving the request, the gateway acquires the sensor node measurement data from the sensor node a1 through the gateway relay service inside the gateway of its own (step 3010). The gateway sends the data so acquired to the local name server as the sensor node measurement response data (3011).

SN Measurement Data Response (Argument: Sensor Node Measurement Data)

After receiving this response data, the local name server sends the sensor node measurement data response (3012) to the global name server.

SN Measurement Data Response (Argument: Sensor Node Measurement Data)

Acquisition of the sensor node measurement data acquired through the paths of the combinations of the sensor node a1 "FFFFFA1" and the gateway c1 "133.144.22.11" is finished in the manner described above.

Similarly, the sensor node measurement data requests are sent three times for the remaining three expansion results in FIG. 25(2) and three records of the records 3014, 3015 and 3016 of the sensor node ID table are looked up for each request to acquire the sensor node measurement data in the same way as described above (step 3013).

After acquiring the four sensor node measurement data, the global name server executes the AND processing for the four measurement data on the basis of the expansion result of the sensor node and gateway correspondence relation definition information shown in FIG. 25(2) and calculates the measurement result value of the sensor node "FF FF FF A0" (step 3017). The measurement data thus calculated is sent as the data response of the sensor node "FFFFFFA0" to the task server. The explanation of the sensor node task processing sequence is thus finished.

It will be apparent that as represented by the foregoing embodiments, the invention can be applied to versatile applications irrespective of the kinds of the sensors and the kinds and features (movement) of the entities as the sensing object. Therefore, the invention can be applied to a broad range of the applications including production management and physical distribution management of products, monitoring, environmental control, and so forth.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A communication method of a computer system including wireless terminals, wireless base stations connected to said wireless terminals through a wireless communication network, and a name server and a task server connected to said wireless base stations through said communication network, wherein, when said wireless terminal exists within a communication range of said wireless base station:

said wireless base station generates a relay service identifier for a relay service of said wireless terminal and executes registration management of a correspondence relation of a set of an identifier of said wireless terminal and said relay service identifier generated;

said name server executes registration management of a set of an identifier of said wireless base station executing the registration management of the set of the correspondence relation and said relay service identifier managed by said wireless base station; and said wireless terminal connected to said wireless communication network is accessed from said task server connected to said communication network through said base station, and wherein said name server manages a correspondence relation of an entity identifier of an entity accompanied by said wireless terminal and the identifier of said wireless terminal; and when said task service of said task server looks up said wireless terminal by using said entity identifier of said entity accompanied by said wireless terminal, said task service sends entity identifier to said name server and asks an identifier solution, and said name server asked for the identifier solution retrieves the identifier of said wireless terminal from said entity management means by using said entity identifier accompanying said request, retrieves the relay service identifier by using the identifier of said wireless terminal retrieved and sends it as a response to said task service.

2. A communication method of a computer system according to claim 1, wherein:

a wireless base station global identifier uniquely designated inside said computer system and a wireless base station local identifier are allocated as said identifier to said wireless base station, said name server generates a wireless base station local identifier for said wireless base station on the basis of said wireless base station global identifier and executes registration management of said wireless base station global identifier and said correspondence relation of the set of said relay service identifier managed by said wireless base station and said identifier of said wireless terminal receiving the relay service identified by said relay service identifier; and said wireless base station stores and manages said wireless base station local identifier so generated and said wireless terminal stores and manages said identifier of its own and said wireless base local identifier of said wireless base station with which said wireless terminal communicates.

3. A communication method of a computer system according to claim 2, wherein:

said wireless terminal transmits said wireless base station local identifier at the time of communication with said wireless base station;

said wireless base station again allocates a new identifier to said wireless terminal when said wireless base station local identifier received is different from a wireless base station local identifier stored therein, again allocates a new relay service corresponding to said wireless terminal and further executes updating registration management of a correspondence relation of the identifier of said wireless terminal again allocated and the new relay service again allocated;

said name server allocates a new wireless base station local identifier to said wireless base station, executes updating registration management of the identifier of said wireless terminal and a correspondence relation of a global identifier of said wireless base station and the identifier of the new relay service again allocated;

said wireless base station executes updating storage management of said wireless base station local identifier again allocated; and said wireless terminal executes updating storage management of said identifier of said wireless terminal again allocated and said wireless base station local identifier again allocated.

4. A communication method of a computer system according to claim 2, wherein:

said name server manages a correspondence relation of an entity identifier of an entity accompanied by said wireless terminal and the identifier of said wireless terminal global identifier; and when said task service inside said task server looks up said wireless terminal by using said entity identifier of said entity accompanied by said wireless terminal, said task service sends entity identifier to said name server and asks an identifier solution, and said name server asked for the identifier solution retrieves the identifier of said wireless terminal from said entity management means by using said entity identifier accompanying said request, retrieves the relay service identifier by using the identifier of said wireless terminal retrieved from said relay service management means and sends it as a response to said task service.

5. A communication method of a computer system according to claim 1, wherein:

said terminal has a memory for storing a first terminal identifier primarily designating itself inside said computer system and a second terminal identifier primarily designating itself inside said base station with which said terminal communicates;

said base station has a memory for storing said first and second terminal identifiers of said terminal with which said base station communicates and said relay identifier in association with one another;

said server has a memory for storing, in association with one another, said identifier of said base station, and said first terminal identifier and said relay identifier stored in said base station in association with one another;

when communication is made with a specific terminal from any part inside said second network, said memory of said server is retrieved and said relay identifier is sent to said base station on the basis of said relay identifier and said identifier of said base station associated with said first terminal identifier representing said specific terminal; and said base station retrieves said memory on the basis of said relay identifier received and gains access to said terminal having said second terminal identifier associated with said relay identifier.

6. A computer system including wireless terminals, wireless base stations connected to said wireless terminals through a first wireless communication network, and a name server computer and a task server computer connected to wireless base stations through a second communication network, wherein said name server computer comprises:

a wireless terminal combination rule for combining a plurality of wireless terminals so that they can be looked up as a logically single wireless terminal, and wireless terminal combination rule management means for managing said wireless terminal combination rule;

a wireless base station combination rule for combining a plurality of wireless base stations so that they can be looked up as a logically single wireless base station, and wireless base station combination rule management means for managing said wireless base station combination rule;

a wireless terminal and wireless base station combination rule for combining a plurality of wireless terminals and base stations so that they can be looked up as a correspondence relation of a logically single wireless terminal and a logically single wireless base station, and wireless terminal and wireless base station combination rule management means for managing said wireless terminal and wireless base station combination rule; and wireless terminal and wireless base station combination control means for interpreting a reference request to said logically single wireless terminal by using said wireless terminal combination rule, said wireless base station combination rule and said wireless terminal and wireless base station combination rule, deciding the combination of a plurality of said wireless terminals and said wireless base stations, sending said wireless terminal reference request for the combination so decided, receiving the result of said reference request sent, and generating the result of said reference request for said logically single wireless terminal by combining said result information received in accordance with said interpretation.

* * * * *